United States Patent
Lee et al.

(10) Patent No.: US 11,671,824 B2
(45) Date of Patent: *Jun. 6, 2023

(54) 5G BROADCAST/MULTICAST SECURITY KEY REFRESH

(71) Applicant: QUALCOMM Incorporated, San Diego, CA (US)

(72) Inventors: Soo Bum Lee, San Diego, CA (US); Miguel Griot, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/992,898

(22) Filed: Aug. 13, 2020

(65) Prior Publication Data
US 2021/0067960 A1 Mar. 4, 2021

Related U.S. Application Data

(60) Provisional application No. 62/891,864, filed on Aug. 26, 2019.

(51) Int. Cl.
| | |
|---|---|
| *H04W 12/0433* | (2021.01) |
| *H04W 12/0431* | (2021.01) |
| *H04W 12/30* | (2021.01) |

(52) U.S. Cl.
CPC ... *H04W 12/0433* (2021.01); *H04W 12/0431* (2021.01); *H04W 12/35* (2021.01)

(58) Field of Classification Search
CPC .............. H04W 12/35; H04W 12/0431; H04W 12/0433; H04W 12/03; H04W 12/041; H04L 12/185; H04L 2209/601; H04L 9/40

See application file for complete search history.

(56) References Cited

U.S. PATENT DOCUMENTS

| | | | |
|---|---|---|---|
| 9,351,149 B2 | 5/2016 | Wang et al. | |
| 2012/0303795 A1* | 11/2012 | Mo | H04L 41/5067 709/224 |

(Continued)

FOREIGN PATENT DOCUMENTS

| | | |
|---|---|---|
| EP | 1838034 | 9/2007 |
| WO | 2015061181 | 4/2015 |

OTHER PUBLICATIONS

International Search Report and Written Opinion—PCT/US2020/046554—ISA/EPO—Sep. 23, 2020.

(Continued)

*Primary Examiner* — Lizbeth Torres-Diaz
(74) *Attorney, Agent, or Firm* — Arent Fox, LLP

(57) ABSTRACT

A user equipment (UE) may update multicast-broadcast key for securing a data session for a multicast or broadcast service. The UE may receive a multicast-broadcast key for the for a multicast or broadcast service carried by a radio bearer (RB) associated with the data session. The UE may receive packets for the multicast or broadcast service. The UE may decode the packets using the multicast-broadcast key, or a key derived from the multicast-broadcast key. The UE may receive an updated multicast-broadcast key for the multicast or broadcast service. The UE may decode the packets for the multicast or broadcast service received on the RB using the updated multicast-broadcast key, or a key derived from the updated multicast-broadcast key.

28 Claims, 17 Drawing Sheets

(56) References Cited

U.S. PATENT DOCUMENTS

| | | | | |
|---|---|---|---|---|
| 2017/0078874 A1* | 3/2017 | Lee | ..................... | H04W 12/043 |
| 2018/0192289 A1* | 7/2018 | Dao | ........................ | H04W 4/06 |
| 2019/0215693 A1 | 7/2019 | Lee et al. | | |
| 2020/0068391 A1* | 2/2020 | Liu | ....................... | H04L 63/162 |
| 2020/0323024 A1* | 10/2020 | Huang | .................. | H04W 76/40 |
| 2020/0344576 A1* | 10/2020 | Li | ........................... | H04W 4/06 |
| 2021/0067958 A1* | 3/2021 | Lee | .................. | H04W 12/0433 |
| 2021/0067960 A1* | 3/2021 | Lee | .................. | H04W 12/0433 |

OTHER PUBLICATIONS

Kambourakis G., et al., "Revisiting WiMAX MBS security", Computers & Mathematics with Applications, Elsevier, Amsterdam, NL, vol. 60, No. 2, Jul. 1, 2010 (Jul. 1, 2010), pp. 217-223, XP027077798, ISSN: 0898-1221, DOI: 10.1016/J.CAMWA.2009.12.032 [retrieved on Jan. 15, 2010] abstract; figure 1 section 1 section 2.

Qualcomm Incorporated: "pCR: Solution for UE-UPF Security Setup", 3GPP Draft, S3-170834, 3rd Generation Partnership Project (3GPP), Mobile Competence Centre, 650, Route Des Lucioles, F-06921 Sophia-Antipolis Cedex, France, Mar. 27, 2017 (Mar. 27, 2017), XP051248585, 6 pages, Retrieved from the Internet: URL: http://www.3gpp.org/ftp/Meetings_3GPP_SYNC/SA3/Docs/. [retrieved on Mar. 27, 2017] the whole document.

Samsung: "5G MBMS Procedure", 3GPP Draft; S2-1810311 5G MBMS Procedure, 3rd Generation Partnership Project (3GPP), Mobile Competence Centre, 650, Route Des Lucioles, F-06921 Sophia-Antipolis Cedex, France, vol. SA WG2, No. Dongguan, China, Oct. 15, 2018-Oct. 19, 2018, Oct. 8, 2018 (Oct. 8, 2018), XP051539297, 12 pages, Retrieved from the Internet: URL: http://www.3gpp.org/ftp/tsg%5Fsa/WG2%5FArch/TSGS2%5F129%5FDongguan/Docs/S2%2D1810311%2Ezip. [retrieved on Oct. 8, 2018] figures B.1.1.1-1, B.1.2.3 section B.1.1 section B.1.2.

* cited by examiner

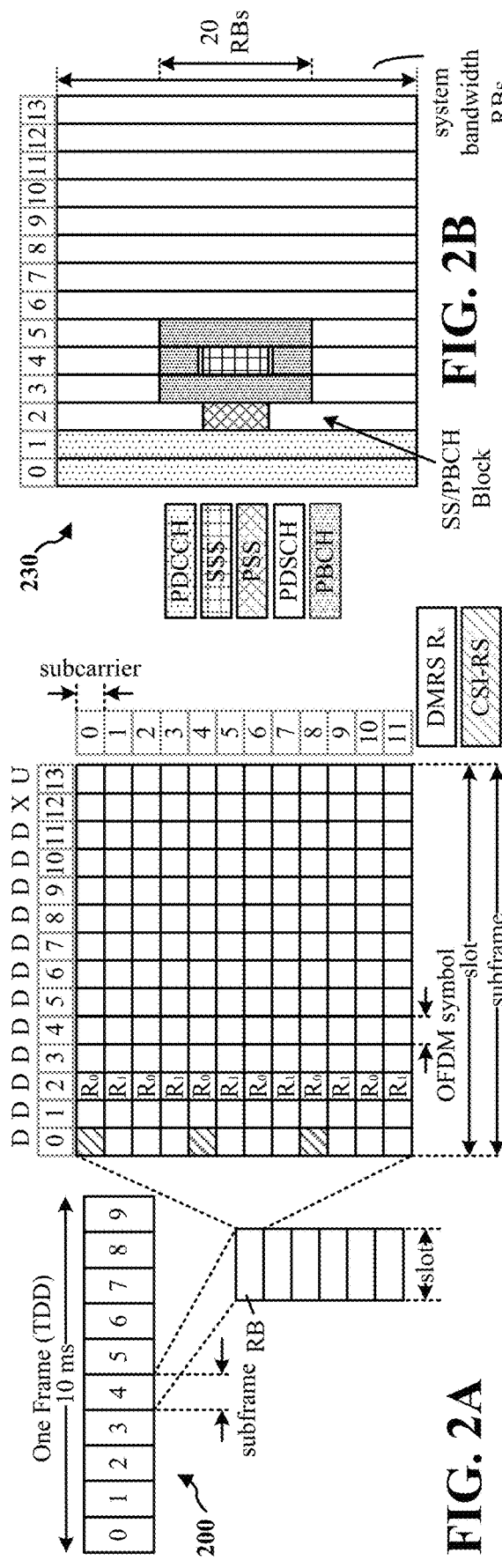
FIG. 2A
FIG. 2B
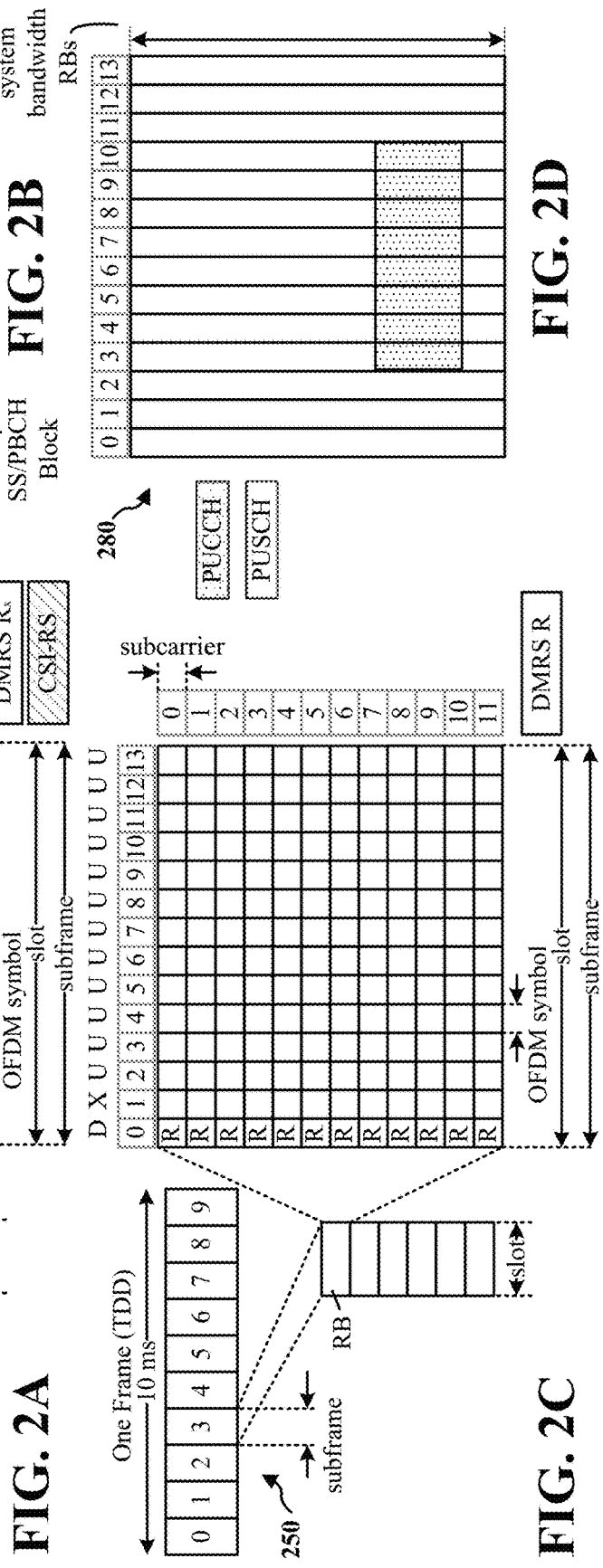
FIG. 2C
FIG. 2D

5G BROADCAST/MULTICAST SECURITY KEY REFRESH

This application claims priority to U.S. Provisional Application No. 62/891,864 titled "5G BROADCAST/MULTICAST SECURITY KEY REFRESH," filed Aug. 26, 2019, which is assigned to the assignee hereof, and incorporated herein by reference in its entirety.

BACKGROUND

Technical Field

The present disclosure relates generally to communication systems, and more particularly, security for broadcast and multicast communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include receiving at least one multicast-broadcast key for a multicast or broadcast service carried by a radio bearer (RB) associated with a data session. The method may include receiving at least one updated multicast-broadcast key for the data session. The method may include decoding the packets for the multicast or broadcast service received on the RB using the at least one updated multicast-broadcast key, or a key derived from the at least one updated multicast-broadcast key.

In an aspect, receiving the at least one updated multicast-broadcast key may include receiving the at least one updated multicast-broadcast key from a session management function (SMF) that generated the at least one updated multicast-broadcast key via non-access stratum (NAS) signaling. Decoding the packets for the multicast or broadcast service using the at least one updated multicast-broadcast key, or a key derived from the at least one updated multicast-broadcast key may include decoding encoded QoS flow packets from a packet data convergence protocol (PDCP) layer using the at least one updated multicast-broadcast key, or a key derived from the at least one updated multicast-broadcast key.

In an aspect, where the SMF generates the at least one multicast-broadcast key, the method may further include transmitting a UE capability message indicating one or more security algorithms and receiving a security policy, via NAS signaling, indicating a selected security algorithm for the decoding.

In an aspect, where the SMF generates the at least one multicast-broadcast key, the method may further include changing from a first cell to a second cell; and decoding packets for the multicast or broadcast service from the second cell without changing the at least one multicast-broadcast key.

In an aspect, receiving the at least one updated multicast-broadcast key includes receiving a root key generated by a session management function (SMF) via NAS signaling; and deriving a cell-specific multicast-broadcast key for a first cell of a radio access network node based on the root key. Decoding the packets for the multicast or broadcast service using the at least one updated multicast-broadcast key, or a key derived from the at least one updated multicast-broadcast key may include decoding the packets flow at a packet data convergence protocol (PDCP) layer using the cell-specific multicast-broadcast key.

In an aspect, the method may further include transmitting a UE capability message indicating one or more security algorithms; and receiving a security policy, via RRC signaling, indicating a selected security algorithm for the decoding.

In an aspect, the method may further include changing from the first cell to a second cell; deriving a cell-specific multicast-broadcast key for the second cell; and decoding the packets from the second cell with the cell-specific multicast-broadcast key for the second cell.

In another aspect, receiving the at least one updated multicast-broadcast key may include receiving the at least one updated multicast-broadcast key from a radio access network node that generated the at least one updated multicast-broadcast key via RRC signaling. Decoding the packets for the multicast or broadcast service using the at least one updated multicast-broadcast key, or a key derived from the at least one updated multicast-broadcast key may include decoding the packets at a packet data convergence protocol (PDCP) layer using the at least one multicast-broadcast key.

In an aspect, the method may further include transmitting a UE capability message indicating one or more security algorithms; and receiving a security policy, via RRC signaling, indicating a selected security algorithm for the decoding.

In an aspect, the method may further include changing from a first cell to a second cell; receiving a new cell-specific multicast-broadcast key from the second cell; and decoding the packets for the QoS flow from the second cell with the new cell-specific multicast-broadcast key for the second cell.

In an aspect, the method may further include, prior to receiving the at least one updated multicast-broadcast key: receiving packets for the multicast or broadcast service; and decoding the packets for the multicast or broadcast service using the at least one multicast-broadcast key, or a key derived from the at least one multicast-broadcast key.

In an aspect, the data session may be a protocol data unit (PDU) session.

In an aspect, the disclosure includes an apparatus for wireless communication. The apparatus may include a memory and at least one processor coupled to the memory. The processor may be configured to receive at least one multicast-broadcast key for a multicast or broadcast service carried by a radio bearer (RB) associated with a data session. The processor may be configured to receive at least one updated multicast-broadcast key for the data session. The processor may be configured to decode the packets for the multicast or broadcast service received on the RB using the at least one updated multicast-broadcast key, or a key derived from the at least one updated multicast-broadcast key.

In an aspect, the at least one processor is configured to receive the at least one updated multicast-broadcast key from a SMF that generated the updated multicast-broadcast key via NAS signaling.

In an aspect, the at least one processor is configured to decode encoded QoS flow packets from a PDCP layer using the at least one updated multicast-broadcast key, or a key derived from the at least one updated multicast-broadcast key.

In an aspect, the at least one processor is configured to: transmit a UE capability message indicating one or more security algorithms; and receive a security policy, via NAS signaling, indicating a selected security algorithm for the decoding.

In an aspect, the at least one processor is configured to: change from a first cell to a second cell; and decode packets for the multicast or broadcast service from the second cell without changing the multicast-broadcast key.

In an aspect, the at least one processor is configured to: receive a root key generated by a SMF via NAS signaling; and derive a cell-specific multicast-broadcast key for a first cell of a radio access network node based on the root key.

In an aspect, the at least one processor is configured to decode the packets at a PDCP layer using the cell-specific multicast-broadcast key.

In an aspect, the at least one processor is configured to: transmit a UE capability message indicating one or more security algorithms; and receive a security policy, via RRC signaling, indicating a selected security algorithm for the decoding.

In an aspect, the at least one processor is configured to: change from the first cell to a second cell; derive a cell-specific multicast-broadcast key for the second cell; and decode the packets from the second cell with the cell-specific multicast-broadcast key for the second cell.

In an aspect, the at least one processor is configured to receive the at least one multicast-broadcast key from a radio access network node that generated the at least one updated multicast-broadcast key via RRC signaling.

In an aspect, the at least one processor is configured to decode the packets at a packet data convergence protocol (PDCP) layer using the updated multicast-broadcast key.

In an aspect, the at least one processor is configured to: transmit a UE capability message indicating one or more security algorithms; and receive a security policy, via RRC signaling, indicating a selected security algorithm for the decoding.

In an aspect, the at least one processor is configured to: change from a first cell to a second cell; receive a new cell-specific multicast-broadcast key from the second cell; and decode the packets from the second cell with the new cell-specific multicast-broadcast key for the second cell.

In an aspect, the data session includes one or more QoS flows, each QoS flow being associated with a unique multicast-broadcast key of the at least one updated multicast-broadcast key.

In an aspect, the data session is a protocol data unit (PDU) session.

In an aspect, the at least one processor is configured to, prior to receiving the at least one updated multicast-broadcast key: receive packets for the multicast or broadcast service; and decode the packets for the multicast or broadcast service using the at least one multicast-broadcast key, or a key derived from the at least one multicast-broadcast key.

In an aspect, the present disclosure provides an apparatus for wireless communication. The apparatus may include means for receiving at least one multicast-broadcast key for a multicast or broadcast service carried by a RB associated with a data session and for receiving at least one updated multicast-broadcast key for the data session. The apparatus may include means for decoding the packets for the multicast or broadcast service received on the RB using the at least one updated multicast-broadcast key, or a key derived from the at least one updated multicast-broadcast key.

In an aspect, the present disclosure provides a non-transitory computer-readable medium storing computer executable code. The code when executed by a processor causes the processor to receive at least one multicast-broadcast key for a multicast or broadcast service carried by a radio bearer (RB) associated with a data session. The code when executed by a processor causes the processor to receive at least one updated multicast-broadcast key for the data session. The code when executed by a processor causes the processor to decode the packets for the multicast or broadcast service received on the RB using the at least one updated multicast-broadcast key, or a key derived from the at least one updated multicast-broadcast key.

In another aspect, the present disclosure provides a method of wireless communication. The method may include determining that a security key for a multicast or broadcast service carried by a RB is to be updated based on a service policy for the multicast or broadcast service. The method may include generating a new security key for the multicast or broadcast service. The method may include distributing the new security key to one or more UEs having a data session for the data session, wherein packets for the multicast or broadcast service carried by the RB are protected by the new security key, or a key derived from the new security key.

In an aspect, the data session includes one or more QoS flows, with each QoS flow being associated with a security key.

In an aspect, determining that the security key is to be updated includes determining that a periodic refresh time indicated by the service policy has expired.

In an aspect, determining that the security key is to be updated includes determining that a change in membership of a group subscribed to the multicast or broadcast service has occurred.

In an aspect, generating the new security key for the multicast or broadcast service includes generating the new security key at the SMF, the method further includes delivering the new key to a multicast-broadcast user plane function that encrypts, integrity protects, or both for the packets of the multicast or broadcast service with the new security key. Distributing the new security key may include delivering the new security key to the one or more UEs via NAS signaling. The NAS signaling may include paging for one or more idle UEs.

In an aspect, generating the new security key for the multicast or broadcast service includes generating the new security key at the SMF. The method may further include deriving a respective cell-specific multicast-broadcast key for one or more cells delivering the RB to the one or more UEs having the data session for the multicast or broadcast service; and delivering the respective cell-specific multicast-broadcast key to a radio access network node. Distributing the new security key to one or more UEs may include delivering the new security key to the one or more UEs via NAS signaling. In an implementation, deriving, by the SMF, the cell-specific multicast-broadcast key for a cell may include deriving the cell-specific multicast-broadcast key based on the new security key and a cell identity of the cell. In an implementation, deriving, by the SMF, the cell-specific multicast-broadcast key for a cell based on the new security key may include generating a unique nonce to be broadcast by each cell of the radio access network node; deriving a node key for the radio access network node based on the unique nonce and the new security key; and deriving, by the radio access network node, the cell-specific multicast-broadcast key. The radio access network node may set the cell-specific multicast-broadcast key as the node key for every cell of the radio access network node, or derive the cell-specific multicast-broadcast key for each cell based on the node key and a respective cell identity. The unique nonce may be a common portion of a cell identifier for each cell of the radio access network node.

In an aspect, generating the new security key for the multicast or broadcast service may include generating the new security key at one or more radio access network nodes delivering the RB to the one or more UEs having the data session for the multicast or broadcast service. Distributing the new security key may include delivering the new security key to the one or more UEs via RRC signaling.

In another aspect, the disclosure provides an apparatus for wireless communication, including a memory; and at least one processor coupled to the memory. The processor may be configured to determine that a security key for a multicast or broadcast service carried by a (RB is to be updated based on a service policy for the multicast or broadcast service. The processor may be configured to generate a new security key for the multicast or broadcast service. The processor may be configured to distribute the new security key to one or more UEs having a data session for the multicast or broadcast service, wherein the multicast or broadcast service carried by the RB is protected by the new security key, or a key derived from the new security key.

In an aspect, the at least one processor is configured to determine that the security key is to be updated in response to determining that a periodic refresh time indicated by the service policy has expired.

In an aspect, the at least one processor is configured to determine that the security key is to be updated in response to determining that a change in membership of a group subscribed to the multicast or broadcast service has occurred.

In an aspect, the apparatus is a SMF and the at least one processor is configured to: generate the new security key at the SMF; and deliver the new key to a multicast-broadcast user plane function that encrypts, integrity protects, or both for the packets for the multicast or broadcast service with the new security key.

In an aspect, the at least one processor is configured to deliver the new security key to the one or more UEs via NAS signaling.

In an aspect, the apparatus is a SMF and the at least one processor is configured to: generate the new security key at the SMF; derive a respective cell-specific multicast-broadcast key for one or more cells delivering the RB to the one or more UEs having the PDU session for the multicast or broadcast service; and deliver the respective cell-specific multicast-broadcast key to a radio access network node.

In an aspect, the at least one processor is configured to deliver the new security key to the one or more UEs via NAS signaling.

In an aspect, the at least one processor is configured to derive the cell-specific multicast-broadcast key based on the new security key and a cell identity of the cell.

In an aspect, the at least one processor is configured to: generate a unique nonce to be broadcast by each cell of the radio access network node; derive a node key for the radio access network node based on the unique nonce and the new security key; and send the unique nonce and the node key to the radio access network node.

In an aspect, the radio access network node sets the cell-specific multicast-broadcast key as the node key for every cell of the radio access network node, or derives the cell-specific multicast-broadcast key for each cell based on the node key and a respective cell identity.

In an aspect, the apparatus is a radio access network node delivering the RB to the one or more UEs having the data session for the multicast or broadcast service and the at least one processor is configured to generate the new security key at the radio access network node.

In an aspect, the at least one processor is configured to deliver the new security key to the one or more UEs via RRC signaling.

In an aspect, the apparatus is a radio access network node and the at least one processor is configured to: receive a node key from a SMF; determine a unique nonce to be broadcast by each cell of the radio access network node; and derive the new security key based on the node key and a cell identity.

In an aspect, the data session includes one or more QoS flows, each QoS flow being associated with a multicast-broadcast key.

In an aspect, the data session is a protocol data unit (PDU) session.

In another aspect, the disclosure provides an apparatus for wireless communication. The apparatus may include means for determining that a security key for a multicast or broadcast service carried by a RB is to be updated based on a service policy for the multicast or broadcast service. The apparatus may include means for generating a new security key for the multicast or broadcast service. The apparatus may include means for distributing the new security key to one or more UEs having a data session for the multicast or broadcast service, wherein the multicast or broadcast service carried by the RB is protected by the new security key, or a key derived from the new security key.

In another aspect, the disclosure provides a non-transitory computer-readable medium storing computer executable code. The code when executed by a processor causes the processor to determine that a security key for a multicast or broadcast service carried by a RB is to be updated based on a service policy for the multicast or broadcast service. The code when executed by a processor causes the processor to generate a new security key for the multicast or broadcast service. The code when executed by a processor causes the processor to distribute the new security key to one or more UEs having a data session for the multicast or broadcast service, wherein the multicast or broadcast service carried by the RB is protected by the new security key, or a key derived from the new security key.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
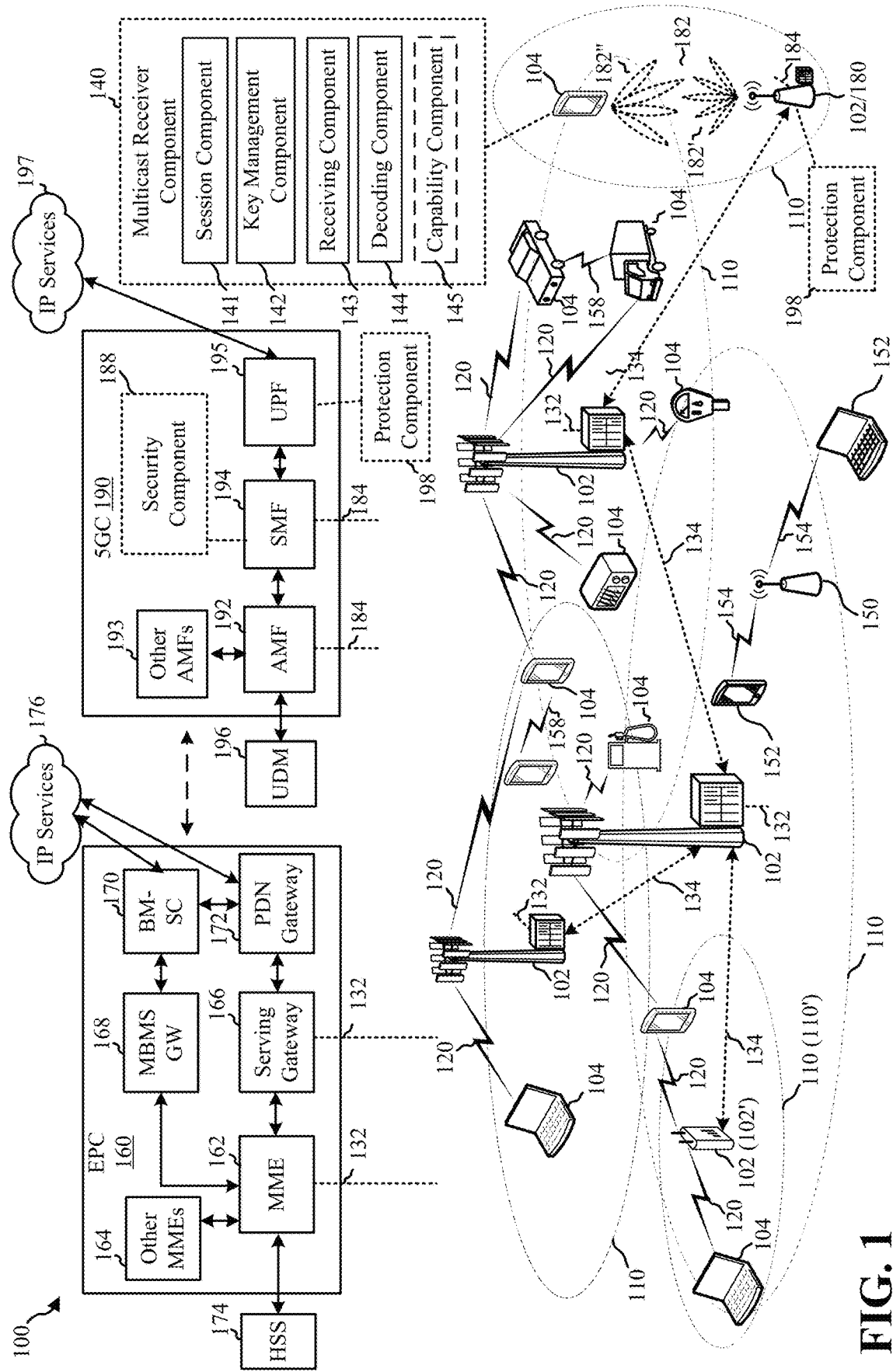
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

A multicast transmission may refer to a transmission that is intended for a group of devices. A broadcast transmission may refer to a transmission that may be received by any device. In 5G NR, a multicast or broadcast service may be any type of data service such as streaming multimedia, file download, Internet of Things, vehicle to vehicle (V2V) or vehicle to anything (V2X) communications. A multicast or broadcast service may be provided by an application. An application provider may want to secure the multicast or broadcast service, for example, by allowing access only to subscribers or by protecting the integrity of packets, or both.

A multicast or broadcast transmission in 5G NR may be secured using a 5G NR network architecture including components of a 5G core (5GC). For example, the application (e.g., an application function (AF)) may interact with the 5GC via a network exposure function (NEF) and/or policy control function (PCF) to establish a service policy. A Session Management Function (SMF) may configure and control one or more quality of service (QoS) flows for the multicast or broadcast service at other nodes including a user plane function (UPF), radio access network (RAN) nodes, and user equipment (UEs). An Access and Mobility Management Function (AMF) may control mobility and non-access stratum (NAS) signaling and transport. The RAN nodes may map the QoS flow to a radio bearer and select broadcast or unicast delivery per UE.

In an aspect, the present disclosure provides for key distribution and management to implement a security policy for a multicast or broadcast service. The UE may transmit a PDU session establishment request to the SMF for a service to which the UE is subscribed. The UE may receive a multicast-broadcast key for a QoS flow for the service. The UE may also receive a RB configuration and receive one or more packets of the QoS flow over the RB. The UE may decode the packets using the multicast-broadcast key. The decoding may include decrypting, verifying the integrity, or a combination thereof. Accordingly, the multicast-broadcast key for the QoS flow may secure the multicast or broadcast service to the UE.

The network may implement security for QoS flows. The network may generate the multicast-broadcast key for the QoS flow carried on the RB for the multicast or broadcast service. The multicast-broadcast key may be for any UE subscribed to the multicast or broadcast service. The network may protect packets of the QoS flow using the key. The network may receive the PDU session establishment request from an authenticated UE at the SMF. The SMF may control distribution of the key to the UE based on the UE being authenticated and being subscribed to the service.

The network may provide for key distribution and management using different architectures. In a first security architecture, security may be provided by the UPF and the QoS flow may be protected between the UPF and the UE. The SMF may generate the multicast-broadcast keys and distribute the keys to the UE and the UPF. In a second security architecture, the RAN nodes may secure the QoS flow using cell-specific keys. The SMF may generate the multicast-broadcast keys, and the UE and SMF may derive cell-specific keys for each cell. In a third security architecture, the RAN nodes may generate the keys and protect the QoS flows.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The small cells include femtocells, picocells, and microcells. The base stations 102 may also be referred to as radio access network (RAN) nodes.

One or more of the UEs 104 may include a multicast receiver component 140 that receives multicast transmissions using a multicast-broadcast key. The multicast receiver component 140 may include a session component 141 that transmits a request for a PDU session for a multicast or broadcast service, a key management component 142 that receives and/or derives keys for a QoS flow for the multicast or broadcast service, a receiving component 143 that receives a RB and QoS flow packets for the multicast or broadcast service, a decoding component that decodes the QoS flow packets using the keys, and an optional capability component 145 that signals UE capabilities and receives a security policy based on UE capabilities.

As discussed above, the 5GC and RAN nodes (e.g., base stations 102) may perform various security functions for multicast or broadcast transmissions using the multicast-broadcast key. An SMF 194 may include a security component 188 that controls key generation and key distribution. Further details of the SMF 194 are described below with respect to FIG. 4. A UPF 195 and/or a base station 102 may include a protection component 198 that protects packets of a QoS flow using the multicast-broadcast key as described herein.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers mayor may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for multicast transmissions to a UE 104 including a multicast receiver component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
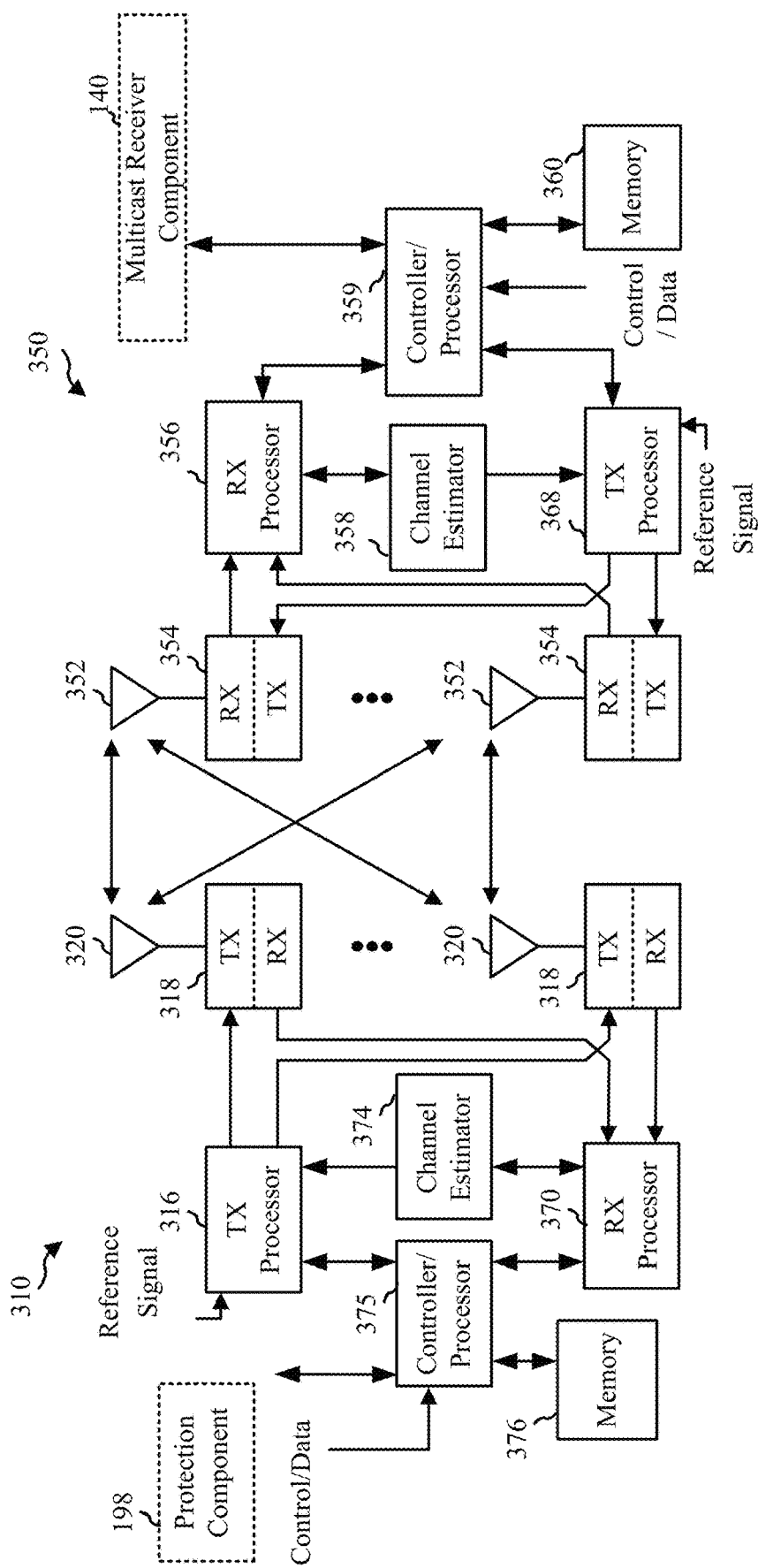
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multicast receiver component 140 of FIG. 1.

At least one of the TX processor 316, the RX processor 370, and the controller/processor 375 may be configured to perform aspects in connection with the protection component 198 of FIG. 1.

Figure 4:
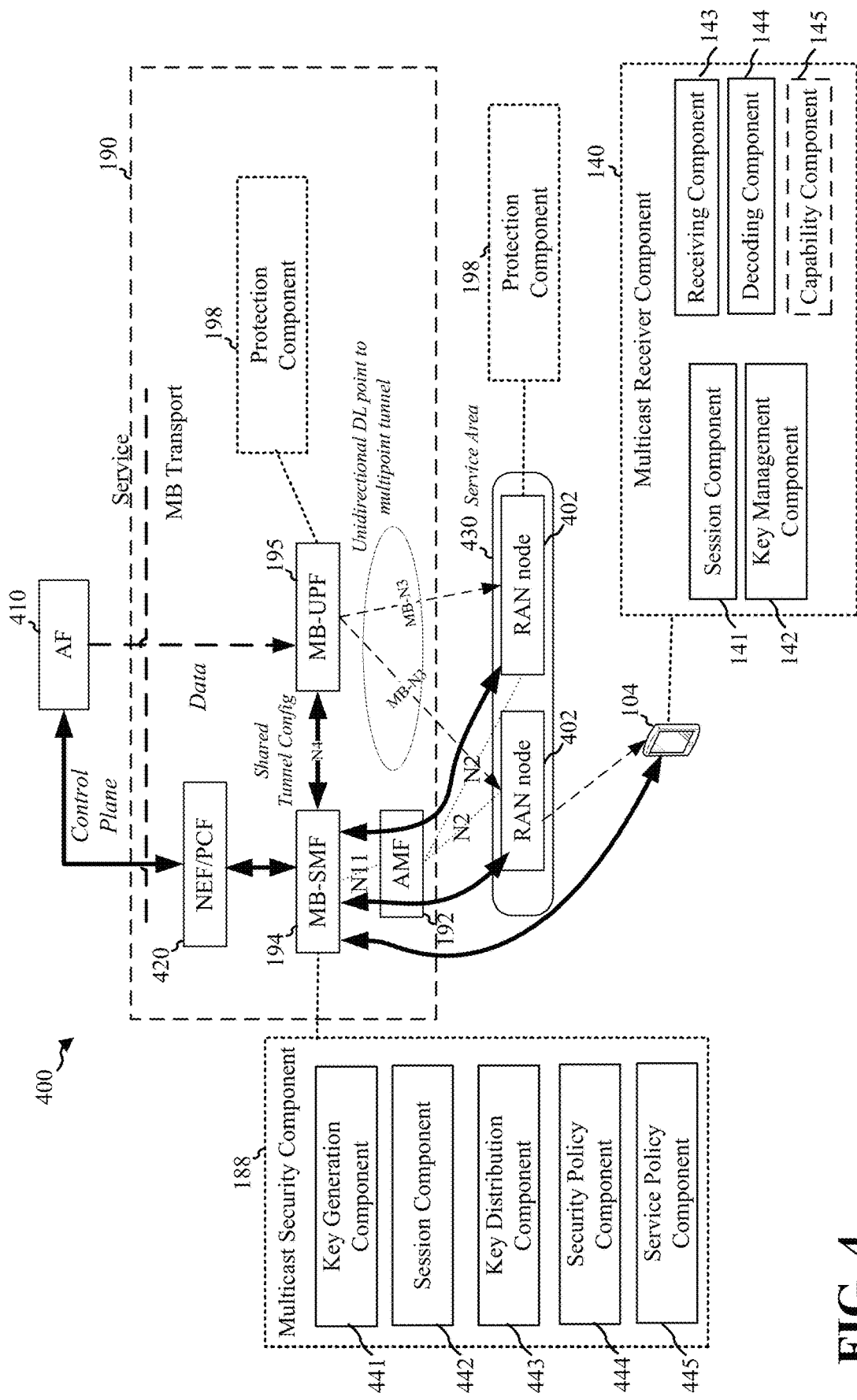
FIG. 4 is a schematic diagram illustrating an example architecture for a network delivering a secured PDU session for a multicast or broadcast service.

FIG. 4 is a diagram of an example architecture for a network 400 including an application function 410, a 5GC 190, a radio access network (RAN) 430, and a UE 104. The AF 410 may communicate with a NEF/PCF 520 of the 5GC via control plane signaling. For example, the AF 410 may provide a service policy to the NEF/PCF 420, which may store the service policy. The SMF 194 may access the NEF/PCF 420 to obtain the service policy.

In an aspect, the SMF 194 may include the security component 188 that performs control key generation, key refresh, and key distribution for multicast or broadcast services. The security component 188 may include a key generation component 441 that generates a multicast-broadcast key for a QoS flow; a session component 442 that receives PDU session requests from UEs and establishes the requested session; a key distribution component 443 that distributes the multicast-broadcast key to the UE 104, the UPF 195, and/or the RAN nodes 402; a security policy component 444 that determines a security policy for a session; and a service policy component 445 that implements a service policy for a multicast or broadcast service.

The SMF 194 may communicate with the AMF 192 to authenticate a UE 104. The SMF 194 may generate or authorize generation of keys based on the service policy for the particular broadcast or multicast service. For example, the service policy may indicate a type of security to be applied (e.g., encryption and/or integrity protection). The SMF 194 may generate keys, or may authorize a RAN node 402 to generate keys. In an aspect, the SMF 194 may generate a multicast-broadcast key (K_MB). The SMF 194 may further derive a key for encryption using a one-way key derivation function (KDF) (e.g., K_MB_enc=KDF(K_MB, "encryption")) and a key for integrity check (e.g., K_MB_int=KDF(K_MB, "integrity protection"). In some cases, a cell-specific key may be delivered to the UE 104 or derived from the K_MB. The UE may derive the appropriate K_MB_enc or K_MB_int using the KDF. The SMF 194 may also control key refresh based on the service policy. Key refresh may include generating a new key to replace an old key. For example, the service policy may specify conditions for refreshing the key for a QoS flow. For instance, the service policy may specify that the key should be replaced whenever there is a change in a group membership or subscription, or when a UE starts or stops a session. Accordingly, a key refresh may prevent former members or subscribers from accessing the QoS flow without the new key. As another example, the service policy may specify a time period for refreshing the key. Example time periods may be hourly, daily, or weekly, although other time periods could be specified. As discussed in further detail below, the SMF 194 may generate or refresh the key itself, or may authorize the RAN nodes 402 to generate or refresh a key.

The SMF 194 may receive a PDU session request for the broadcast or multicast service from the UE 104. The SMF 194 may determine whether the UE 104 is subscribed to the multicast or broadcast service. For example, the SMF 194 may check the service policy in the NEF/PCF 420. Alternatively or additionally, the SMF may perform secondary authentication and authorization between the UE 104 and the AF 410. If the UE 104 is subscribed to the multicast or broadcast service, the SMF 194 may distribute or authorize distribution of the multicast-broadcast key for the QoS flow to the UE 104. If the SMF 194 generated the multicast-broadcast key, the SMF 194 may distribute the multicast-broadcast key to one or more UEs via NAS signaling. If the RAN node 402 generated the multicast-broadcast key, the RAN node 402 may distribute the multicast-broadcast key to the UE (e.g., via RRC signaling).

Figure 5:
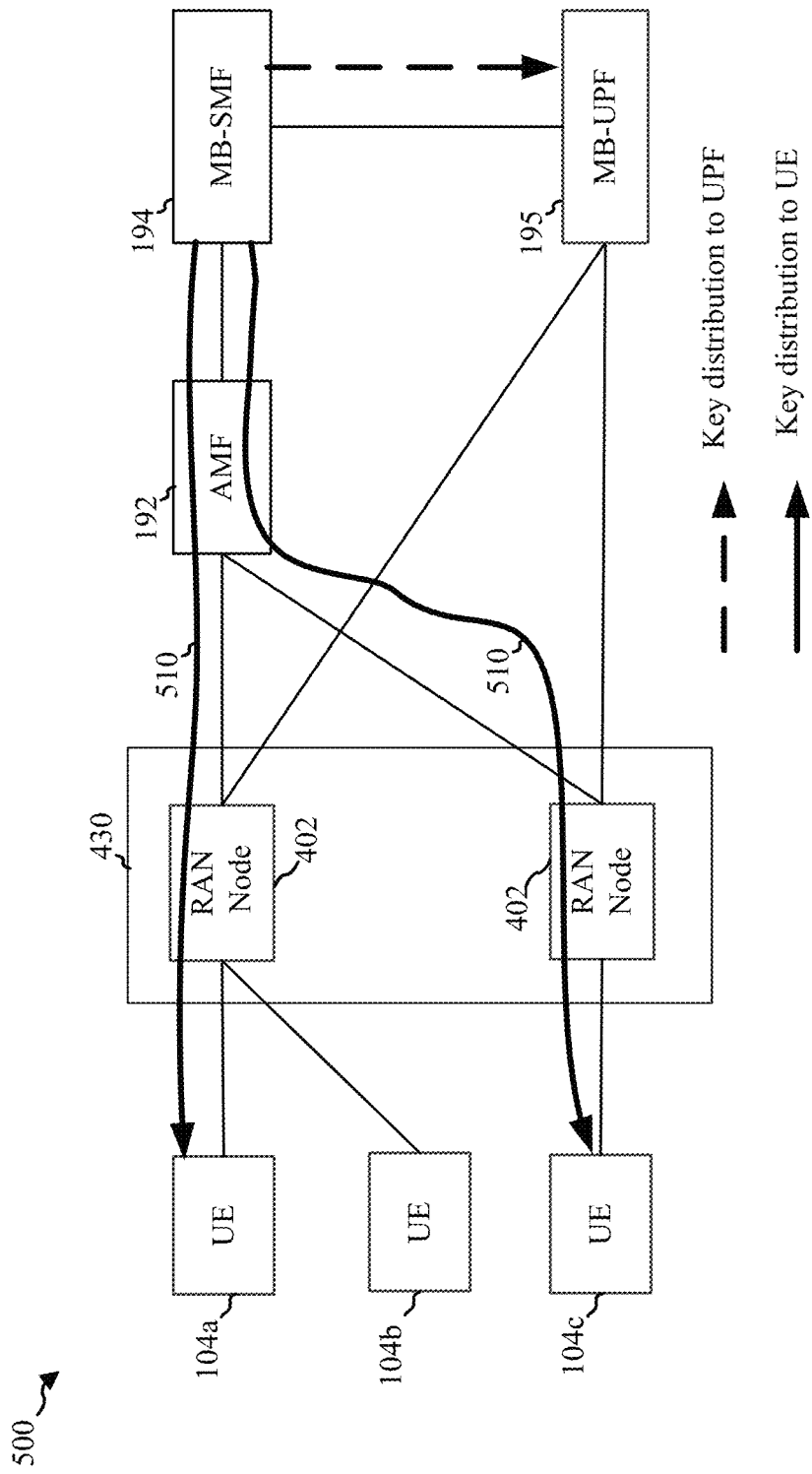
FIG. 5 is a schematic diagram illustrating a first example network architecture for protecting the PDU session at a UPF using a key generated by a SMF.

FIG. 5 is a diagram of a first security architecture 500 in which the SMF 194 generates keys and distributes keys to the UEs 104 and the UPF 195. The SMF 194 may generate a single multicast-broadcast key for a QoS flow. The SMF 194 may distribute the multicast-broadcast key to one or more UEs 104 that are subscribed to the multicast or broadcast service. For example, the SMF 194 may distribute the multicast-broadcast key during PDU session establishment. After authenticating the UE (e.g., a first UE 104a) and confirming that the first UE 104a is subscribed to the multicast or broadcast service, the SMF may distribute the multicast-broadcast key to the UE 104a via NAS signaling 510. The NAS signaling 510 may be carried over the RAN 430 to the specific UE 104a using RAN security to protect the key. A second UE 104b that is not subscribed to the multicast or broadcast service may not receive the multicast-broadcast key and will be unable to decode packets of the QoS flow, even if the UE 104b is connected to the same RAN node 402 and is able to receive the radio signals. A third UE 104c that is subscribed to the same multicast or broadcast service may receive the same multicast-broadcast key via NAS signaling 510, even if the third UE 104c is connected via a different RAN node 402. The third UE 104c may receive packets of the QoS flow from its respective RAN node 402 and may decode the packets with the multicast-broadcast key.

The SMF 194 may also distribute the multicast-broadcast key to the UPF 195. For example, the SMF 194 may transmit the key via a N4 interface. The UPF 195 may protect packets of the QoS flow using the multicast-broadcast key. For example, the UPF 195 may encrypt the packets using the multicast-broadcast key with a known cryptographic algorithm (e.g., a symmetric algorithm). As another example, the UPF 195 may integrity protect the packets using the multicast-broadcast key (e.g., with a signed hash of the packet). The UPF 195 may also perform both encryption and integrity protection. The UPF 195 may forward the protected packets to the RAN nodes 402, which may deliver the protected packets to the UEs 104 on multicast or unicast channels. A UE 104 may change RAN nodes 402 without changing the multicast-broadcast key because the packets for the QoS flow are protected at the UPF 195.

Figure 6:
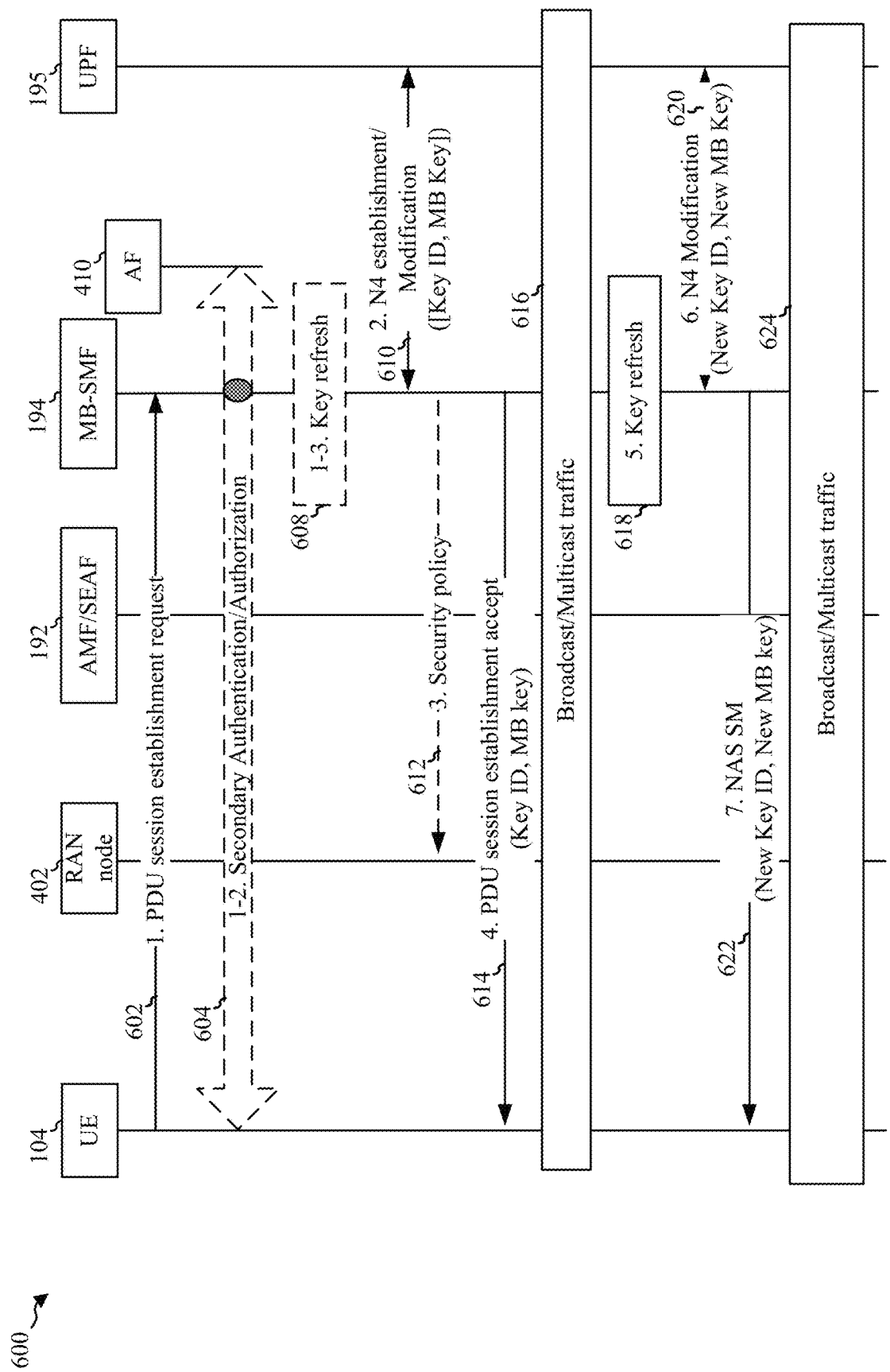
FIG. 6 is a message diagram including example communications and processing by a UE and the first example network architecture for delivering the secured PDU session for the multicast or broadcast service.

FIG. 6 is a message diagram 600 illustrating example messages that may be transmitted between a UE 104, RAN node 402, AMF 192, SMF 194, AF 410, and UPF 195 for key generation, key refresh, and key distribution for multicast or broadcast services using the first security architecture 500.

The UE 104 may transmit a PDU session establishment request 602. The PDU session establishment request 602 may indicate a multicast or broadcast service that the UE 104 is requesting. The UE may transmit the PDU session establishment request 602 via the AMF 192, which may authenticate the UE 104. The AMF 192 may include or be co-located with a security anchor function (SEAF) that authenticates the UE 104.

The network may optionally perform secondary authentication or authorization 604. For example, the service policy for the AF 410 may require the UE 104 to authenticate with the AF 410, for example, by logging in with credentials. Accordingly, the UE 104 and AF 410 may exchange messages for the secondary authentication or authorization 604.

The SMF 194 may optionally perform a key refresh 608 in response to the PDU session establishment request. For example, the service policy for the AF 410 may require a key refresh whenever a UE establishes a PDU session (e.g., to start receiving the service). For example, such a policy may prevent a UE 104 from accessing previously broadcast packets.

The SMF 194 may transmit an N4 establishment or modification 610 to the UPF 195. The N4 establishment or modification 610 may include a key ID that identifies the multicast-broadcast key for the QoS flow and the actual multicast-broadcast key. Accordingly, the SMF may distribute the multicast-broadcast key to the UPF 195 such that the UPF 195 may protect packets of the QoS flow with the multicast-broadcast key.

The SMF 194 may transmit a security policy 612 to the RAN node 402. The security policy may indicate specific rules for QoS flow for a UE 104. In an aspect, since the UPF 195 may protect the QoS flow, the security policy 612 may instruct the RAN node 402 to disable RAN security (e.g., PDCP layer security) for the QoS flow.

The SMF 194 may transmit a PDU session establishment accept message 614 to the UE 104. The PDU session establishment accept message 614 may be a NAS signaling message including the key ID that identifies the multicast-broadcast key for the QoS flow and the actual multicast-broadcast key. Accordingly, the SMF 194 may distribute the multicast-broadcast key to the UE 104 that requested the PDU session.

At block 616, the UE 104 may receive multicast or broadcast traffic. For example, the UE 104 may receive packets for the QoS flow via a radio bearer. The packets may be protected by the UPF 195 using the multicast-broadcast key. The UE 104 may decode the packets using the multicast-broadcast key.

The SMF 194 may perform a key refresh 618 according to the service policy of the AF 410. The SMF 194 may generate a new multicast-broadcast key to replace the multicast-broadcast key used in the block 616.

The SMF 194 may transmit a N4 modification message 620 including the new key identifier and the new multicast-broadcast key to the UPF 195. The SMF 194 may transmit a NAS signaling message 622 to the UE 104 including the new key identifier and the new multicast-broadcast key. Accordingly, in block 624, multicast or broadcast traffic may continue in a similar manner as in block 616 using the new multicast-broadcast key.

Figure 7:
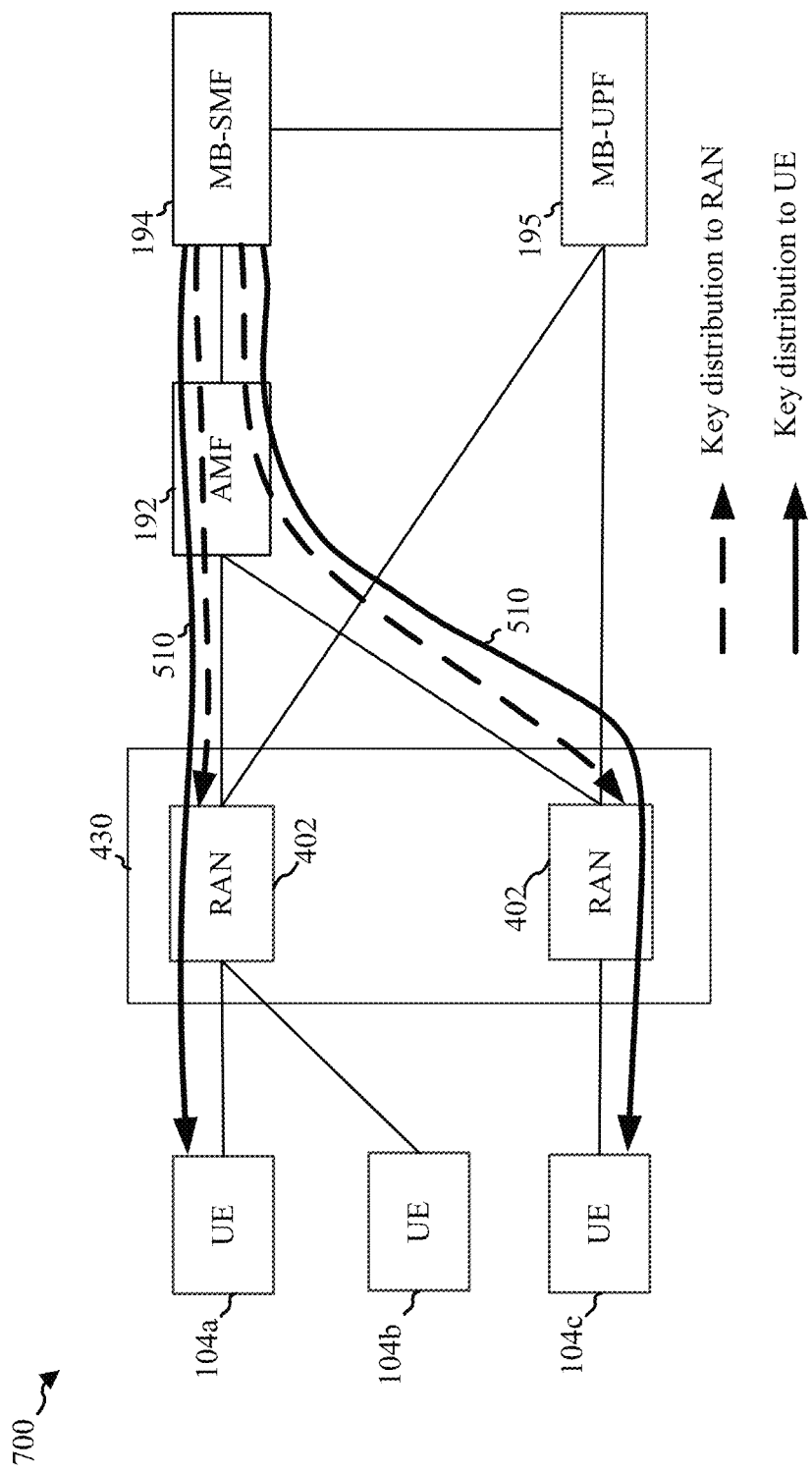
FIG. 7 is a schematic diagram illustrating a second example network architecture for protecting the PDU session at a RAN node using a key generated by a SMF.

FIG. 7 is a diagram of a second security architecture 700 in which the SMF 194 generates keys and distributes keys to the UEs 104 and to the RAN nodes 402. The SMF 194 may generate a single root multicast-broadcast key for a QoS flow. The packets for a QoS flow may be protected at the RAN nodes 402 using cell-specific keys derived from the root multicast-broadcast key. The SMF 194 may distribute the root multicast-broadcast key to one or more UEs 104 that are subscribed to the multicast or broadcast service using NAS signaling 510 as described above with respect to FIG. 5. Each UE 104 that receives the root multicast-broadcast key may derive the cell-specific key for the cell of the RAN node 402 to which the UE 104 is connected.

The SMF 194 may derive one or more keys for each RAN node 402 using the root multicast-broadcast key. The SMF 194 may not deliver the root multicast-broadcast key to the RAN nodes 402. Accordingly, a compromised RAN node 402 may not be able to derive the keys of the other RAN nodes. The SMF 194 and the UE 104 may generate a cell-specific key based on a cell identity, a nonce, or a RAN node identity.

For a cell identity, the UE may obtain the cell identity from system information broadcast by the RAN node 402. The UE 104 may use a one way key derivation function to derive the cell-specific key based on the root multicast-broadcast key and the cell identity. Similarly, the RAN nodes 402 may request a cell-specific ID from the SMF 194 by providing the cell ID to the SMF 194. Accordingly, the SMF 194 may use the one way key derivation function to derive the cell-specific key based on the root multicast-broadcast key and the cell identity. The SMF 194 may deliver the requested cell-specific keys to the RAN node 402.

A nonce may be a random number generated by the SMF 194 or the RAN node 402 and associated with the particular RAN node 402. The RAN node 402 may broadcast the nonce (e.g., on system information or a multicast control channel) for each cell of the RAN node 402. The UE 104 and the SMF 194 may use the one way key derivation function to derive a node key based on the root multicast-broadcast key and the nonce. In a first option, all cells of the RAN node 402 may use the same cell-specific key. The UE 104 and the SMF 194 or RAN node 402 may set the cell-specific key to the node key. In a second option, each cell of the RAN node 402 may have a different cell-specific key. The UE 104 and the SMF 194 or the RAN node 402 may use the one way key derivation function to derive the cell-specific key based on the node key and the cell identity.

For a RAN node identity, a first portion of a cell identity may common to all cells of the RAN node. The first portion may be used as the nonce, and a second portion of the cell identity that is unique to the cell may be used as the cell identity in the one way key derivation function.

The RAN node 402 may protect packets of the QoS flow using the cell-specific key. In an aspect, the RAN node 402 may protect the packets at the PDCP layer using the cell-specific key. For example, the RAN node 402 may encrypt the packets using the cell-specific key with a known cryptographic algorithm (e.g., the PDCP security function). As another example, the RAN node 402 may integrity protect the packets using the cell-specific key (e.g., with a signed hash of the packet). The RAN node 402 may also perform both encryption and integrity protection. The RAN node 402 may forward the protected packets to the UEs 104 on multicast or unicast channels.

Figure 8:
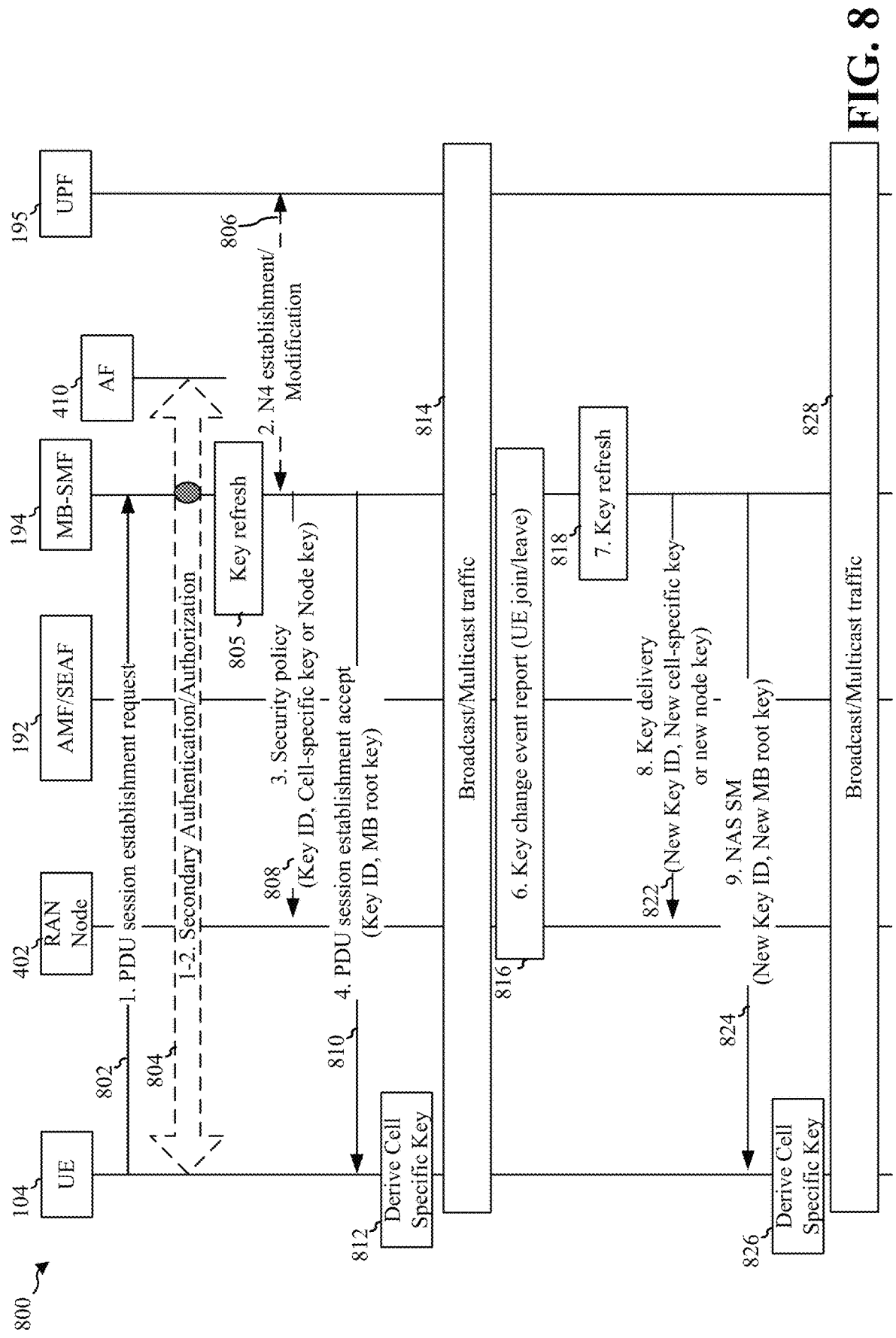
FIG. 8 is a message diagram including example communications and processing by a UE and the second example network architecture for delivering the secured PDU session for the multicast or broadcast service.

FIG. 8 is a message diagram 800 illustrating example messages that may be transmitted between a UE 104, RAN node 402, AMF 192, SMF 194, AF 410, and UPF 195 for key generation, key refresh, and key distribution for multicast or broadcast services using the second security architecture 700.

The UE 104 may transmit a PDU session establishment request 802. The PDU session establishment request 802 may indicate a multicast or broadcast service that the UE 104 is requesting. The UE may transmit the PDU session establishment request 802 via the AMF 192, which may authenticate the UE 104. The AMF 192 may include or be co-located with a SEAF that authenticates the UE 104.

The network may optionally perform secondary authentication or authorization 804. For example, the service policy for the AF 410 may require the UE 104 to authenticate with the AF 410, for example, by logging in with credentials. Accordingly, the UE 104 and AF 410 may exchange messages for the secondary authentication or authorization 804.

The SMF 194 may optionally perform a key refresh 805 in response to the PDU session establishment request. For example, the service policy for the AF 410 may require a key refresh whenever a UE establishes a PDU session (e.g., to start receiving the service). For example, such a policy may prevent a UE 104 from accessing previously broadcast packets.

The SMF 194 may transmit an N4 establishment or modification 806 to the UPF 195. The N4 establishment or modification 806 may identify the QoS flow to the UPF 195.

The SMF 194 may transmit a security policy 808 to the RAN node 402. The security policy 808 may indicate specific rules for QoS flow for a UE 104. In an aspect, since the RAN node 402 protects the QoS flow, the security policy 808 may include a key identifier, and a cell-specific key or the node key. Accordingly, the SMF 194 may distribute the cell-specific key to the RAN Node 402 with the security policy 808.

The SMF 194 may transmit a PDU session establishment accept message 810 to the UE 104. The PDU session establishment accept message 810 may be a NAS signaling message including the key ID that identifies the multicast-broadcast key for the QoS flow and the actual multicast-broadcast key, which may be a root multicast-broadcast key. Accordingly, the SMF 194 may distribute the multicast-broadcast key to the UE 104 that requested the PDU session.

At block 812, the UE 104 may derive a cell-specific key for the cell of the RAN node 402 to which the UE 104 is connected. For example, the UE 104 may derive the cell-specific key using the cell identifier, nonce, or node identifier as discussed above regarding FIG. 7.

At block 814, the UE 104 may receive multicast or broadcast traffic. For example, the UE 104 may receive packets for the QoS flow via a radio bearer. The packets may be protected by the RAN node 402 using the cell-specific key. The UE 104 may decode the packets using the cell-specific key.

The RAN node 402 may send a key change event report 816 to the SMF 194. For example, the RAN node 402 may report a UE join/leave event to the SMF 194. The SMF 194 may detect the key change event based on one or both of the key change event report 816 or a subscription change notified identified by SMF 194 (e.g., via UDM). The SMF 194 may also determine the key change event independently based on the key expiry (e.g., key lifetime)

The SMF 194 may perform a key refresh 818 according to the service policy of the AF 410. The SMF 194 may generate a new root multicast-broadcast key to replace the multicast-broadcast key used in the block 814. The SMF 194 may also derive any cell-specific keys or node keys.

The SMF 194 may transmit a key delivery message 822 including the new key identifier and the new cell-specific keys or node keys to the RAN node 402. The SMF 194 may transmit a NAS signaling message 824 to the UE 104 including the new key identifier and the new root multicast-broadcast key. In block 826, the UE 104 may derive the cell-specific key in a similar manner as in block 812. Accordingly, in block 828, multicast or broadcast traffic may continue in a similar manner as in block 814 using the new multicast-broadcast key.

Figure 9:
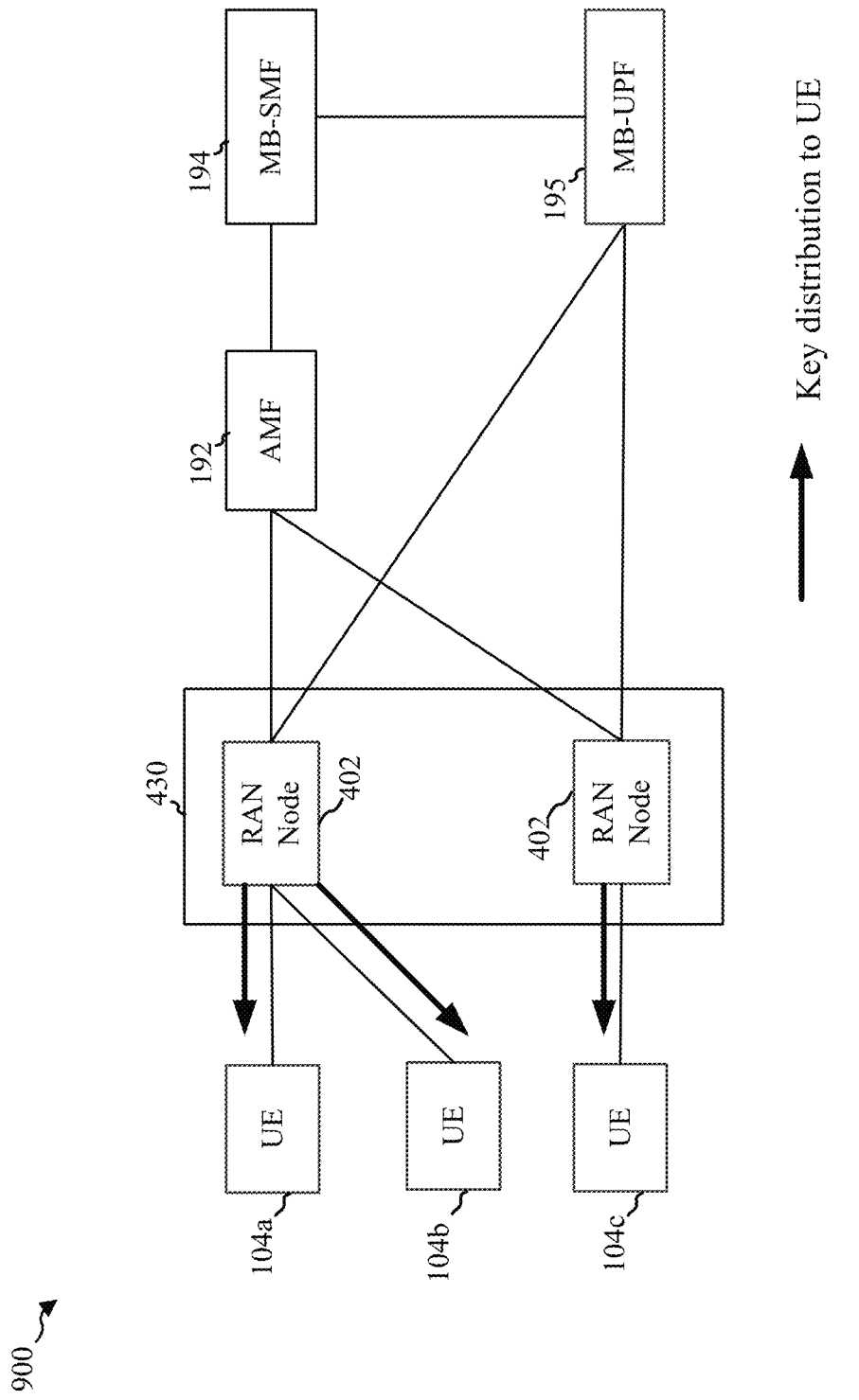
FIG. 9 is a schematic diagram illustrating a third example network architecture for protecting the PDU session at a RAN node using a key generated by the RAN node.

FIG. 9 is a diagram of a third security architecture 900 in which the SMF 194 authorizes the RAN nodes 402 to generate keys and distribute keys to the UEs 104. For example, the SMF 194 may provide a security policy for the QoS flow. The RAN nodes 402 may generate a cell-specific multicast-broadcast key for each QoS flow and distribute the cell-specific multicast-broadcast key to the subscribed UEs 104 (e.g., using RRC signaling). A UE 104 may need to be in connected mode with the RAN node 402 to receive the cell-specific multicast-broadcast key. The UE 104 may need to obtain a new cell-specific multicast-broadcast key when moving between RAN nodes 402.

The RAN node 402 may protect packets of the QoS flow using the cell-specific key. In an aspect, the RAN node 402 may protect the packets at the PDCP layer using the cell-specific key. For example, the RAN node 402 may encrypt the packets using the cell-specific key with a known cryptographic algorithm (e.g., the PDCP security function). As another example, the RAN node 402 may integrity protect the packets using the cell-specific key (e.g., with a signed hash of the packet). The RAN node 402 may also perform both encryption and integrity protection. The RAN node 402 may forward the protected packets to the UEs 104 on multicast or unicast channels.

Figure 10:
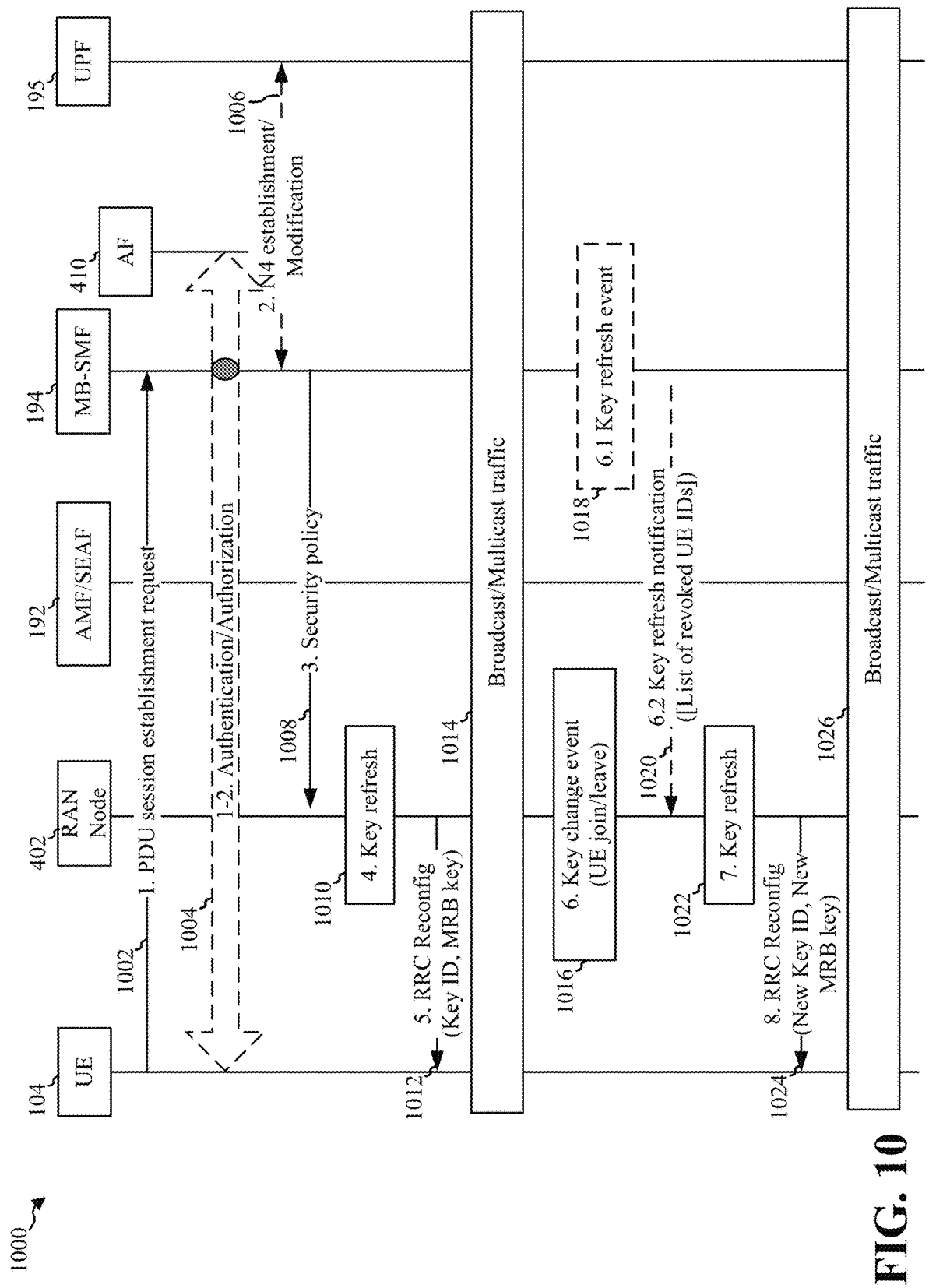
FIG. 10 is a message diagram including example communications and processing by a UE and the third example network architecture for delivering the secured PDU session for the multicast or broadcast service.

FIG. 10 is a message diagram 1000 illustrating example messages that may be transmitted between a UE 104, RAN node 402, AMF 192, SMF 194, AF 410, and UPF 195 for key generation, key refresh, and key distribution for multicast or broadcast services using the third security architecture 900.

The UE 104 may transmit a PDU session establishment request 1002. The PDU session establishment request 1002 may indicate a multicast or broadcast service that the UE 104 is requesting. The UE 104 may transmit the PDU session establishment request 1002 via the AMF 192, which may authenticate the UE 104. The AMF 192 may include or be co-located with a SEAF that authenticates the UE 104.

The network may optionally perform secondary authentication or authorization 1004. For example, the service policy for the AF 410 may require the UE 104 to authenticate with the AF 410, for example, by logging in with credentials. Accordingly, the UE 104 and AF 410 may exchange messages for the secondary authentication or authorization 1004.

The SMF 194 may transmit an N4 establishment or modification 1006 to the UPF 195. The N4 establishment or modification 1006 may identify the QoS flow to the UPF 195.

The SMF 194 may transmit a security policy 1008 to the RAN node 402. The security policy 1008 may indicate specific rules for a QoS flow for a UE 104. In an aspect, since the RAN node 402 generates keys, the security policy 1008 may not include a key generated by the SMF 194. The security policy 1008 may instruct or authorize the RAN node 402 to generate an distribute a cell-specific key. The security policy 1008 may also include rules for performing key refresh to configure the RAN node 402 to autonomously perform key refresh for the QoS flow based on configured events.

At block 1010, the RAN node 402 may optionally perform a key refresh depending on the security policy. That is, the RAN node 402 may generate a new key in response to the addition of the UE 104 to the QoS flow if indicated by the security policy.

The RAN node 402 may transmit an RRC reconfiguration message 1012 to the UE 104. The RRC reconfiguration message may include a key ID and the generated cell-specific multicast-broadcast key for the QoS flow. Accordingly, the RAN node 402 may distribute the cell-specific multicast-broadcast key to the UE 104. In an aspect, the RRC reconfiguration message 1012 may include a PDU session establishment accept message.

At block 1014, the UE 104 may receive multicast or broadcast traffic. For example, the UE 104 may receive packets for the QoS flow via a radio bearer. The packets may be protected by the RAN node 402 using the cell-specific multicast-broadcast key. The UE 104 may decode the packets using the cell-specific multicast-broadcast key.

At block 1016 the RAN node 402 may detect a key change event configured by the security policy. For example, the RAN node 402 may detect a UE 104 joining or leaving (e.g., disconnecting or changing cells). The RAN node 402 may trigger a key refresh in block 1022 in response to the key change event. Additionally, or alternatively, the SMF 194 may detect a key refresh event at block 1018. For example, the SMF 194 may detect a key change event configured by the service policy such as a subscription change (e.g., a subscriber joining or leaving the group) or a periodic key change. The SMF 194 may send a key change refresh notification 1020 to the RAN node 402 to trigger the key refresh event at block 1018. The key change refresh notification 1020 may include a list of revoked UE IDs corresponding to UEs that should not receive a new key.

The RAN node 402 may perform the key refresh in block 1022 according to the security policy. The RAN node 402 may generate a new cell-specific multicast-broadcast key to replace the cell-specific multicast-broadcast key used in the block 1014.

The SMF 194 may transmit a RRC reconfiguration message 1024 including the new key identifier and the new cell-specific keys or node keys to the RAN node 402. Accordingly, in block 1026, multicast or broadcast traffic may continue in a similar manner as in block 1014 using the new cell-specific multicast-broadcast key.

Figure 11:
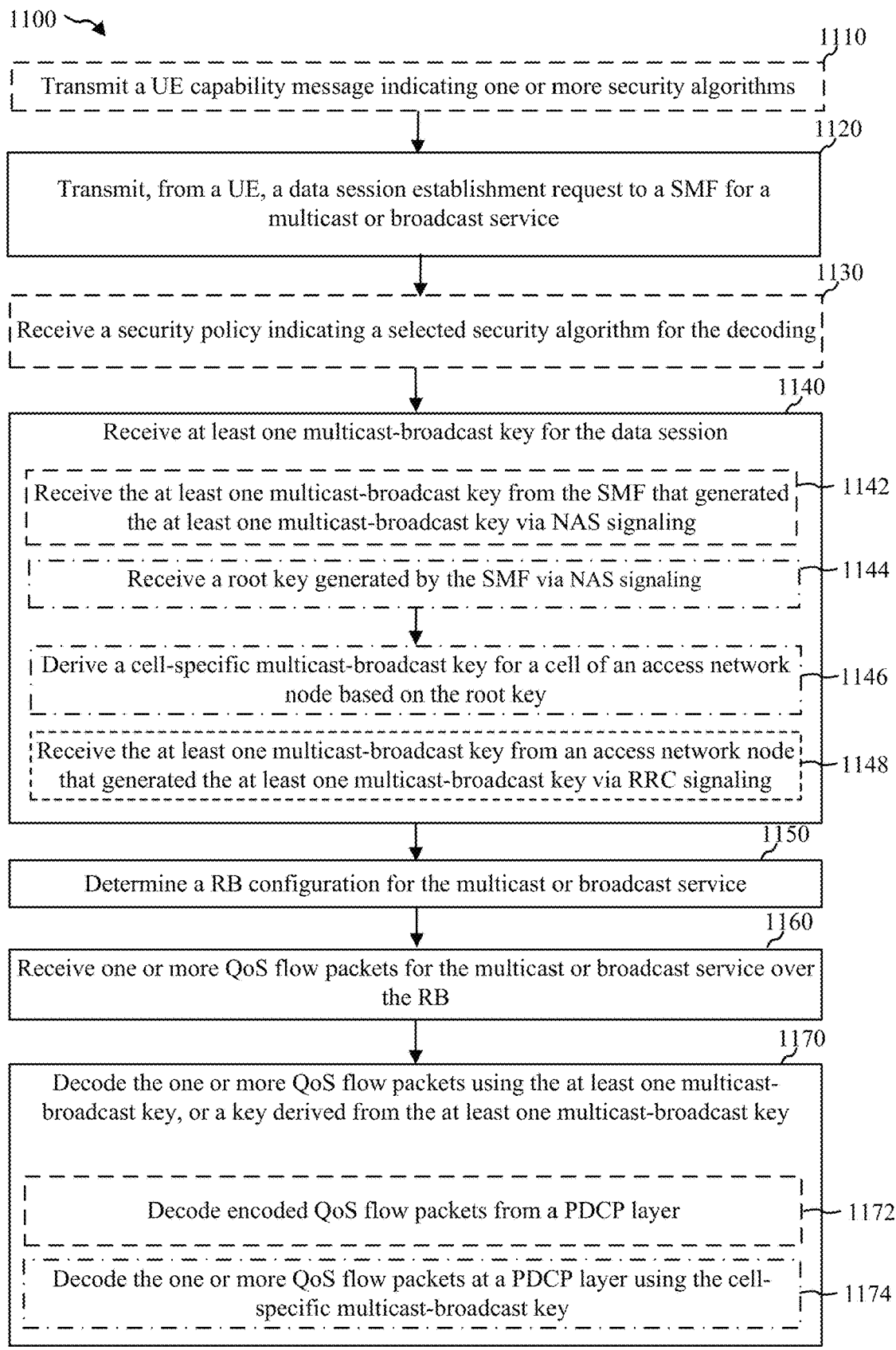
FIG. 11 is a flowchart of an example method of receiving a packets for a PDU session for a multicast or broadcast service.

FIG. 11 is a flowchart of a method 1100 of wireless communication that may be performed by a UE (e.g., the UE 104, which may include the memory 360 and which may be the entire UE 104 or a component of the UE 104 such as the multicast receiver component 140, TX processor 368, the RX processor 356, and/or the controller/processor 359) for receiving a multicast transmission. The method 1100 may be performed in communication with the SMF 194 including the security component 188 and one of a RAN node 402 or UPF 195 including the protection component 198. Optional blocks are shown with dashed lines.

At block 1110, the method 1100 may optionally include transmitting a UE capability message indicating one or more security algorithms. In an aspect, for example, the UE 104, the TX processor 368, and/or the controller/processor 359 may execute the multicast receiver component 140 and/or the capability component 145 to transmit a UE capability message indicating one or more security algorithms. Accordingly, the UE 104, the TX processor 368, and/or the controller/processor 359 executing the multicast receiver component 140 and/or the capability component 145 may provide means for transmitting a UE capability message indicating one or more security algorithms.

At block 1120, the method 1100 may include transmitting, from a UE, a data session establishment request to a SMF for a multicast or broadcast service. In an aspect, for example, the UE 104, the TX processor 368, and/or the controller/processor 359 may execute the multicast receiver component 140 and/or the session component 141 to transmit, from a UE 104, a data session establishment request (e.g., PDU session establishment request 602) to a SMF for a multicast or broadcast service. In an aspect, the UE 104 may be subscribed to the multicast or broadcast service. The PDU session establishment request may include an indication of a type of service or a domain name indicating a multicast or broadcast service. Accordingly, the UE 104, the TX processor 368, and/or the controller/processor 359 executing the multicast receiver component 140 and/or the capability component 145 may provide means for transmitting, from a UE, a data session establishment request to a SMF for a multicast or broadcast service to which the UE is subscribed.

At block 1130, the method 1100 may optionally include receiving a security policy indicating a selected security algorithm for the decoding. In an aspect, for example, the UE 104, the RX processor 356, and/or the controller/processor 359 may execute the multicast receiver component 140 and/or the capability component 145 to receive a security policy indicating a selected security algorithm for the decoding. For example, in the first security architecture 500, the capability component 145 may receive the security policy via NAS signaling, whereas in the second security architecture 700 and the third security architecture 900, the capability component 145 may receive the security policy via RRC signaling. Accordingly, the UE 104, the RX processor 356, and/or the controller/processor 359 executing the multicast receiver component 140 and/or the capability component 145 may provide means for receiving a security policy indicating a selected security algorithm for the decoding.

At block 1140, the method 1100 may include receiving at least one multicast-broadcast key for the data session. In an aspect, for example, the UE 104, the RX processor 356, and/or the controller/processor 359 may execute the multicast receiver component 140 and/or the key management component 142 to receive at least one multicast-broadcast key for the data session. In an aspect, the data session may include one or more QoS flows, each QoS flow being associated with a unique multicast-broadcast key of the at least one multicast-broadcast key. Accordingly, the UE 104, the RX processor 356, and/or the controller/processor 359 executing the multicast receiver component 140 and/or the key management component 142 may provide means for receiving a multicast-broadcast key for the data session.

For example, at sub-block 1142, the block 1140 may optionally include receiving the at least one multicast-broadcast key from the SMF that generated the at least one multicast-broadcast key via NAS signaling. For instance, in the first security architecture 500, the UE 104a may receive the at least one multicast-broadcast key from the SMF 194 that generated multicast-broadcast key via NAS signaling 510.

As another example, at sub-block 1144, the block 1140 may optionally include receiving a root key generated by the SMF via NAS signaling. For instance, in the second architecture 700, the UE 104a may receive the root key from the SMF 194 via NAS signaling 510. At sub-block 1146 the block 1140 may also optionally include deriving a cell-specific multicast-broadcast key for a cell of an access network node based on the root key. For instance, the key management component 142 may derive the cell-specific multicast-broadcast key for the cell of the RAN node 402 based on the root key. In an aspect, deriving the cell-specific multicast-broadcast key for a cell based on the root key may include deriving the cell-specific multicast-broadcast key based on the root key and a cell identity of the cell. In an aspect, deriving the cell-specific multicast-broadcast key for a cell based on the root key may include: receiving a unique nonce broadcast by the cell of the radio access network node; deriving a node key for the radio access network node based on the unique nonce and the root key; and deriving the cell-specific multicast-broadcast key from the node key. For example, the key management component 142 may set the cell-specific multicast-broadcast key as the node key, or derive the cell-specific multicast-broadcast key for the cell based on the node key and the cell identity. In an aspect, the nonce is a common portion of a cell identifier for each cell of the radio access network node. Further, in the security architecture 700, the UE 104 may change from a first cell to a second cell. The key management component 142 may derive a cell-specific multicast-broadcast key for the second cell. The decoding component 144 may decode one or more QoS flow packets from the second cell with the cell-specific multicast-broadcast key for the second cell.

As another example, at sub-block 1148, the block 1140 may optionally include receiving the at least one multicast-broadcast key from an access network node that generated the at least one multicast-broadcast key via RRC signaling. For example, in security architecture 900 the key management component 142 may receive the at least one multicast-broadcast key from the RAN node 402 that generated the at least one multicast-broadcast key via RRC signaling. Further, in the security architecture 900, the UE 104 may change from a first cell to a second cell. The key management component 142 may receive a new cell-specific multicast-broadcast key from the second cell. The decoding component 144 may decode one or more QoS flow packets from the second cell with the new cell-specific multicast-broadcast key for the second cell.

At block 1150, the method 1100 may include determining a RB configuration for the multicast or broadcast service. In an aspect, for example, the UE 104, the RX processor 356, and/or the controller/processor 359 may execute the multicast receiver component 140 and/or the receiving component 143 to determine the RB configuration for the multicast or broadcast service. For instance, the receiving component 143 may receive the RB configuration from a RAN node 402 in an RRC configuration message. In another example, the RB configuration may be preconfigured, derived, or specified in a standards document or regulation. Accordingly, the UE 104, the RX processor 356, and/or the controller/processor 359 executing the multicast receiver component 140 and/or the receiving component 143 may provide means for determining a RB configuration for the multicast or broadcast service.

At block 1160, the method 1100 may include receiving one or more QoS flow packets for the multicast or broadcast service over the RB. In an aspect, for example, the UE 104, the RX processor 356, and/or the controller/processor 359 may execute the multicast receiver component 140 and/or the receiving component 143 to receive one or more QoS flow packets for the multicast or broadcast service over the RB. Accordingly, the UE 104, the RX processor 356, and/or the controller/processor 359 executing the multicast receiver component 140 and/or the receiving component 143 may provide means for receiving one or more QoS flow packets for the multicast or broadcast service over the RB.

At block 1170, the method 1100 may include decoding the one or more QoS flow packets using the at least one multicast-broadcast key, or a key derived from the multicast-broadcast key. The decoding may include decrypting, verifying the integrity, or a combination thereof. In an aspect, for example, the UE 104, the RX processor 356, and/or the controller/processor 359 may execute the multicast receiver component 140 and/or the decoding component 144 to decode the one or more QoS flow packets using the at least one multicast-broadcast key, or a key derived from the at least one multicast-broadcast key. Accordingly, the UE 104, the RX processor 356, and/or the controller/processor 359 executing the multicast receiver component 140 and/or the decoding component 144 may provide means for decoding the one or more QoS flow packets using the at least one multicast-broadcast key, or a key derived from the at least one multicast-broadcast key.

For example, at sub-block 1172, the block 1170 may optionally include decoding encoded QoS flow packets from a PDCP layer. For instance, in the security architecture 500, the decoding component 144 may implement a protocol layer above the PDCP layer (e.g., a multicast-broadcast layer) that receives a packet or PDU from the PDCP layer. The decoding component 144 may utilize a security algorithm (e.g., as indicated in the security policy) to decode the packet or PDU from the PDCP layer. In an aspect, PDCP security may be disabled by the security policy in favor of the higher layer security algorithm. Further, the UE 104 may change from a first cell to a second cell in the security architecture 500. The decoding component 144 may decode the one or more QoS flow packets from the second cell without changing the at least one multicast-broadcast key. In particular, since the multicast-broadcast layer shares a key with the UPF 195, the key may not change when changing cells and/or RAN nodes 402.

As another example, at sub-block 1174 the block 1170 may optionally include decoding the one or more QoS flow packets at a PDCP layer using the cell-specific multicast-broadcast key. For instance, in the security architecture 700 the decoding component 144 may decode the one or more QoS flow packets at the PDCP layer using the cell-specific multicast-broadcast key derived from the root key. In another implementation for the security architecture 900, the decoding component 144 may decode the one or more QoS flow packets at the PDCP layer using the cell-specific multicast-broadcast key received from the RAN node 402.

Figure 12:
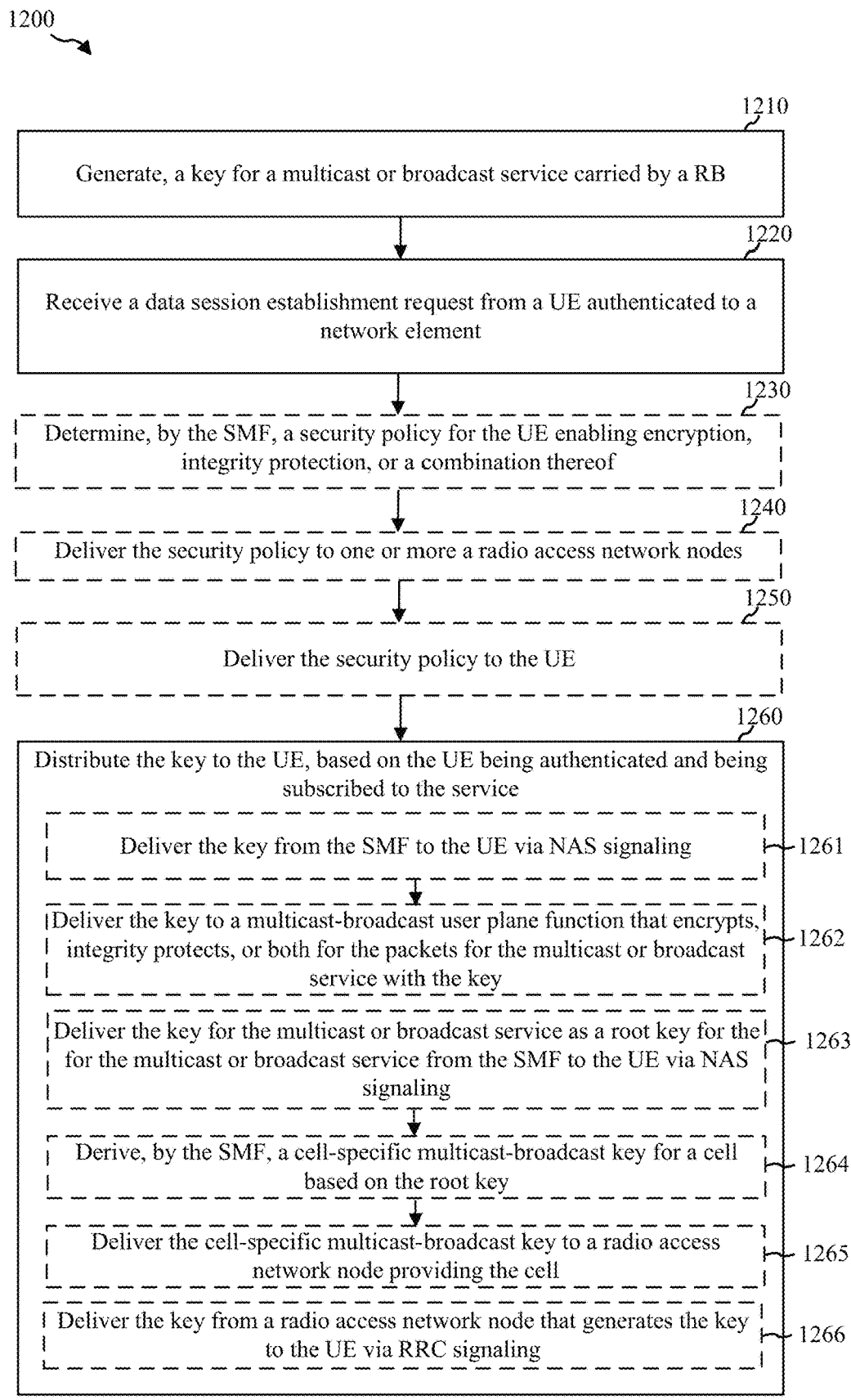
FIG. 12 is a flowchart of an example method of key generation and distribution for a PDU session for a multicast or broadcast service.
Figure 17:
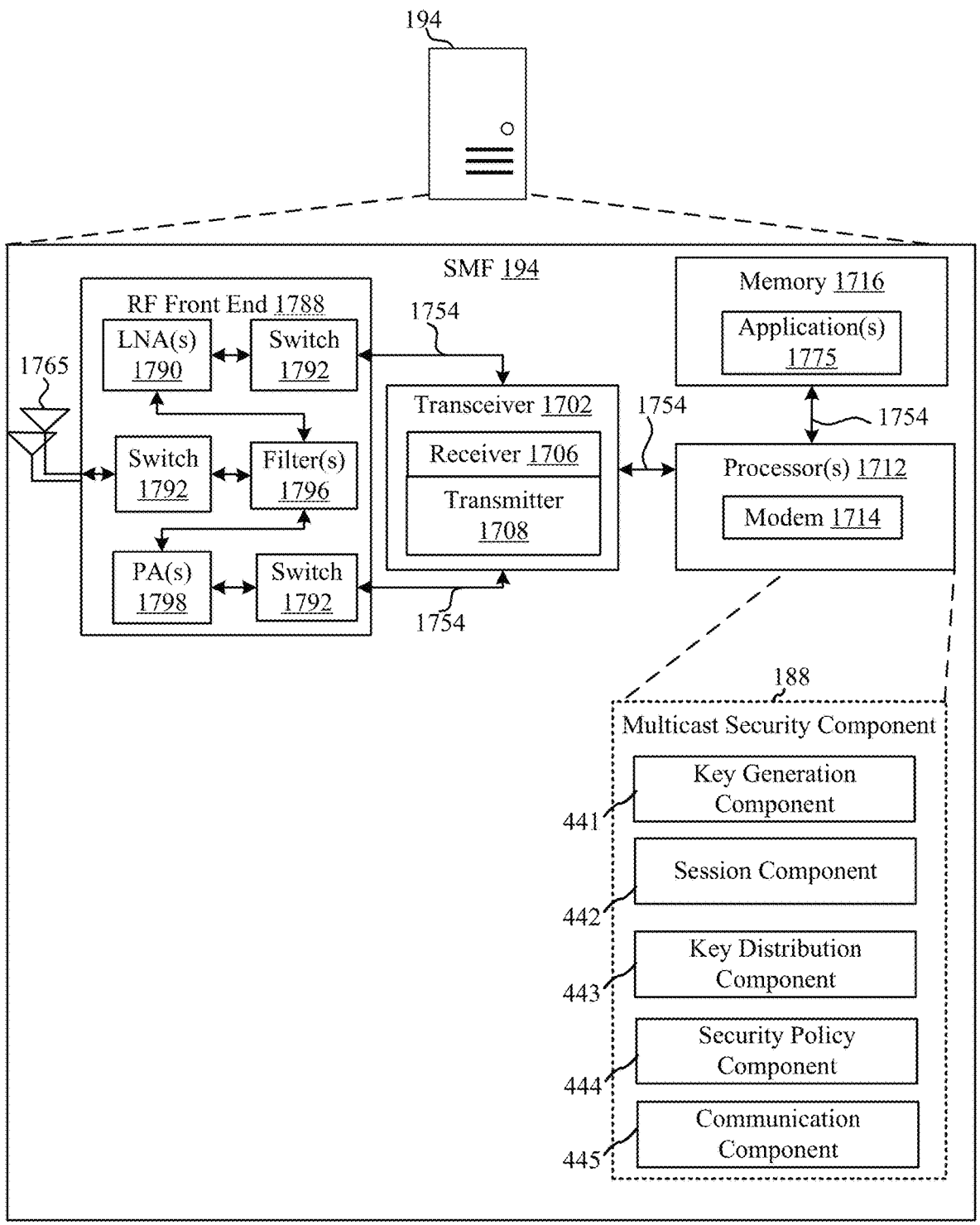
FIG. 17 is a schematic diagram of example components of the SMF of FIG. 1.

FIG. 12 is a flowchart of a method 1200 of wireless communication that may be performed by a network (e.g., the network 400). In an aspect, the method 1200 may be performed by a network node such as the SMF 194 including the security component 188. As illustrated in FIG. 17, the SMF 194 may include 1712 that executes instructions stored in the memory 1716 for implementing the security component 188 to provide key management and distribution for a multicast or broadcast service. The method 1200 may be performed in communication with one or more UEs 104 including the multicast receiver component 140 and one of a RAN node 402 or UPF 195 including the protection component 198. Optional blocks are shown with dashed lines.

At block 1210, the method 1200 may include generating, a key for a multicast or broadcast service carried by a RB for a multicast or broadcast service. The key may be for any UE subscribed to the multicast or broadcast service. Packets for the multicast or broadcast service carried by the RB may be protected by the key, or a key derived from the key. In an aspect, for example, the SMF 194 or the processor 1712 may execute the security component 188 and/or the key generation component 441 to generate, the key for the multicast or broadcast service carried by the RB. In an implementation, the key generation component 441 may randomly or pseudo-randomly generate the key. The key generation component 441 may ensure that the key is unique to the network 400. Accordingly, the SMF 194 or the processor 1712 executing the security component 188 and/or the key generation component 441 may provide means for generating, a key for a multicast or broadcast service carried by a RB for a multicast or broadcast service.

At block 1220, the method 1200 may include receiving a data session establishment request from a UE authenticated to a network element. In an aspect, for example, the SMF 194 or the processor 1712 may execute the security component 188 and/or the session component 442 to receive a data session establishment request from a UE 104 authenticated to a network element (e.g., AMF 192. Accordingly, the SMF 194 or the processor 1712 executing the security component 188 and/or the session component 442 may provide means for receiving a data session establishment request from a UE authenticated to a network element.

At block 1230, the method 1200 may optionally include determining, by the SMF, a security policy for the UE that specifies encryption, integrity protection, or a combination thereof. In an aspect, for example, the SMF 194 or the processor 1712 may execute the security component 188 and/or the security policy component 444 to determine, by the SMF 194, a security policy for the UE 104 that specifies encryption, integrity protection, or a combination thereof. Accordingly, the SMF 194 or the processor 1712 executing the security component 188 and/or the security policy component 444 may provide means for determining, by the SMF, a security policy for the UE that specifies encryption, integrity protection, or a combination thereof.

At block 1240, the method 1200 may optionally include delivering the security policy to one or more a radio access network nodes. In an aspect, for example, the SMF 194 or the processor 1712 may execute the security component 188 and/or the security policy component 444 to delivering the security policy to one or more a radio access network nodes. Accordingly, the SMF 194 or the processor 1712 executing the security component 188 and/or the security policy component 444 may provide means for delivering the security policy to one or more a radio access network nodes.

At block 1250, the method 1200 may optionally include delivering the security policy to the UE. In an aspect, for example, the SMF 194 or the processor 1712 may execute the security component 188 and/or the security policy component 444 to deliver the security policy to the UE. For example, the security policy component 444 may deliver the security policy to the UE via NAS signaling (e.g., in security architecture 500). As another example, the security policy component 444 may instruct the radio access network node to deliver the security policy to the UE via RRC signaling (e.g., in security architecture 700 and security architecture 900). Accordingly, the SMF 194 or the processor 1712 executing the security component 188 and/or the security policy component 444 may provide means for delivering the security policy to the UE.

At block 1260, the method 1200 may include distributing the key to the UE, based on the UE being authenticated and being subscribed to the service. In an aspect, for example, the SMF 194 or the processor 1712 may execute the security component 188 and/or the key distribution component 443 to distribute the key to the UE, based on the UE being authenticated and being subscribed to the service. Accordingly, the SMF 194 or the processor 1712 executing the security component 188 and/or the key distribution component 443 may provide means for distributing the key to the UE, based on the UE being authenticated and being subscribed to the service.

For example, in sub-block 1261, the block 1260 may optionally include delivering the key from the SMF to the UE via NAS signaling. For instance, the key distribution component 443 may deliver the key from the SMF to the UE via NAS signaling 510. In sub-block 1262, the block 1260 may further optionally include delivering the key to a multicast-broadcast user plane function that encrypts, integrity protects, or both for the packets for the multicast or broadcast service with the key. For instance, the key distribution component 443 may deliver the key to the UPF 195 including the protection component 198 that encrypts, integrity protects, or both for the packets for the multicast or broadcast service with the key.

For example, in sub-block 1263, the block 1260 may optionally include delivering the key for the multicast or broadcast service as a root key for the multicast or broadcast service from the SMF to the UE via NAS signaling. For instance the key distribution component 443 may deliver the key for the multicast or broadcast service flow as a root key for the multicast or broadcast service from the SMF 194 to the UE 104 via NAS signaling 510. Further, in sub-block 1264, the block 1260 may optionally include deriving, by the SMF, a cell-specific multicast-broadcast key for a cell based on the root key. For instance, the key distribution component 443 may derive, by the SMF, a cell-specific multicast-broadcast key for a cell based on the root key. Additionally, in sub-block 1265, the block 1260 may optionally include delivering the cell-specific multicast-broadcast key to a radio access network node providing the cell. For instance, the key distribution component 443 may deliver the cell-specific multicast-broadcast key to a RAN node 402 providing the cell.

Returning to sub-block 1264, deriving the cell-specific multicast-broadcast key for a cell based on the root key may include deriving the cell-specific multicast-broadcast key based on the root key and a cell identity of the cell. In another aspect, deriving the cell-specific multicast-broadcast key for a cell based on the root key may include generating a unique nonce to be broadcast by each cell of the radio access network node; deriving a node key for the radio access network node based on the unique nonce and the root key; and deriving, by the radio access network node, the cell-specific multicast-broadcast key. For example, the radio access network node may set the cell-specific multicast-broadcast key as the node key for every cell of the radio access network node, or derive the cell-specific multicast-broadcast key for each cell based on the node key and a respective cell identity. In another aspect, the nonce is a common portion of a cell identifier for each cell of the radio access network node.

In another example, in sub-block 1266, the block 1260 may optionally include delivering the key from a radio access network node that generates the key to the UE via RRC signaling. For example, the key distribution component 443 may instruct a radio access network node that generates the key to deliver the key to the UE via RRC signaling.

Figure 13:
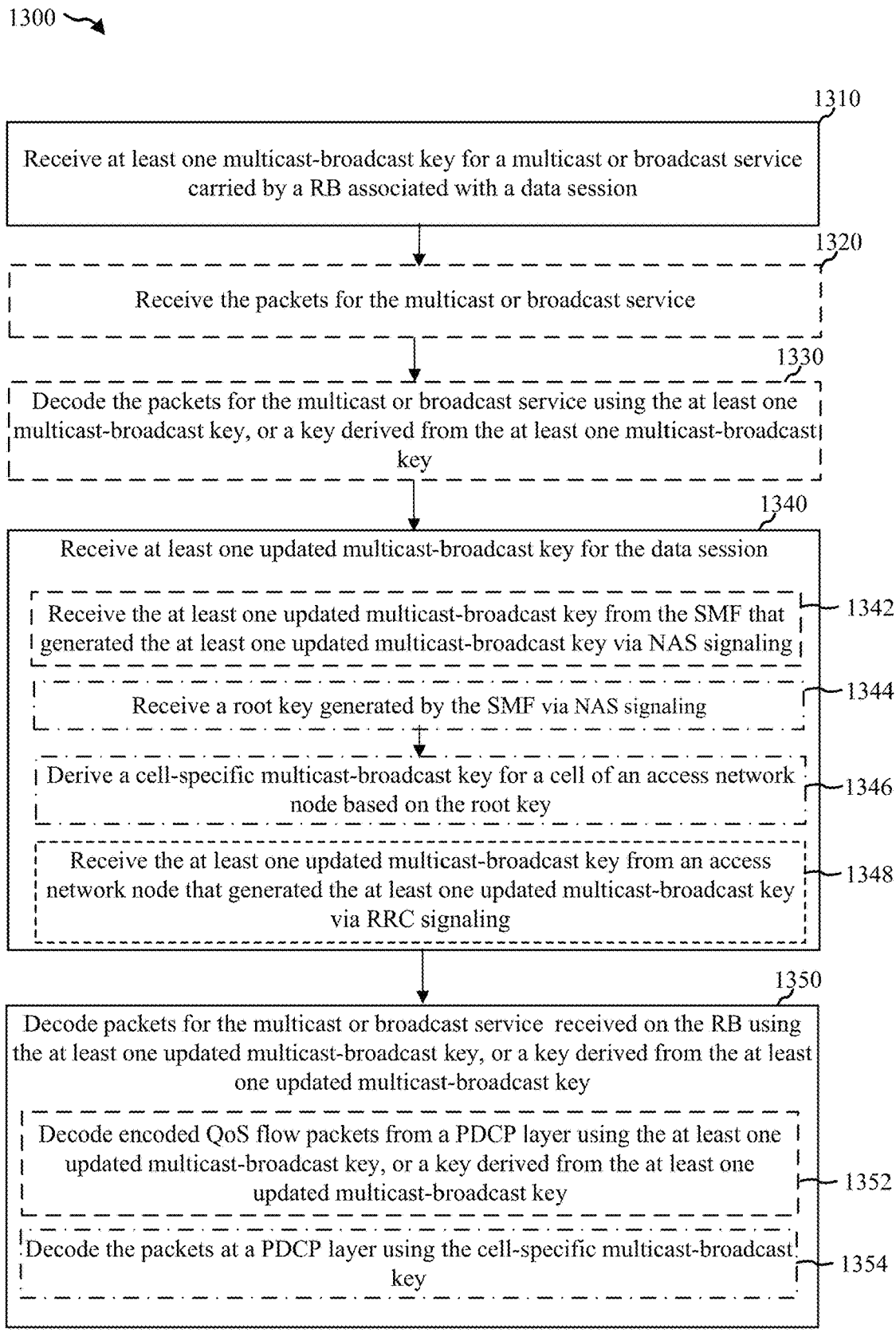
FIG. 13 is a flowchart of an example method for a UE to refresh a key for a PDU session for a multicast or broadcast service.

FIG. 13 is a flowchart of a method 1300 of wireless communication that may be performed by a UE (e.g., the UE 104, which may include the memory 360 and which may be the entire UE 104 or a component of the UE 104 such as the multicast receiver component 140, TX processor 368, the RX processor 356, and/or the controller/processor 359) for receiving a multicast transmission. The method 1300 may be performed in communication with the SMF 194 including the security component 188 and one of a RAN node 402 or UPF 195 including the protection component 198. Optional blocks are shown with dashed lines.

At block 1310, the method 1300 may include receiving at least one multicast-broadcast key for a multicast or broadcast service carried by a RB associated with a data session. In an aspect, for example, the UE 104, the RX processor 356, and/or the controller/processor 359 may execute the multicast receiver component 140 and/or the key management component 142 to receive at least one multicast-broadcast key for the multicast or broadcast service carried by the RB associated with the data session. In some implementations, the data session may be a PDU session. In some implementations, the data session may include one or more QoS flows, each QoS flow being associated with a unique multicast-broadcast key of the at least one multicast-broadcast key. Accordingly, the UE 104, the RX processor 356, and/or the controller/processor 359 executing the multicast receiver component 140 and/or the key management component 142 may provide means for receiving at least one multicast-broadcast key for a multicast or broadcast service carried by a RB associated with the data session.

At block 1320, the method 1300 may optionally include receiving packets for the multicast or broadcast service. In an aspect, for example, the UE 104, the RX processor 356, and/or the controller/processor 359 may execute the multicast receiver component 140 and/or the receiving component 143 to receive the packets for the multicast or broadcast service. Accordingly, the UE 104, the RX processor 356, and/or the controller/processor 359 executing the multicast receiver component 140 and/or the receiving component 143 may provide means for receiving the packets for the multicast or broadcast service.

At block 1330, the method 1300 may optionally include decoding the packets for the multicast or broadcast service using the at least one multicast-broadcast key, or a key derived from the at least one multicast-broadcast key. In an aspect, for example, the UE 104, the RX processor 356, and/or the controller/processor 359 may execute the multicast receiver component 140 and/or the decoding component 144 to decode the packets for the multicast or broadcast service using the at least one multicast-broadcast key, or a key derived from the at least one multicast-broadcast key. Accordingly, the UE 104, the RX processor 356, and/or the controller/processor 359 executing the multicast receiver component 140 and/or the decoding component 144 may provide means for decoding the packets for the multicast or broadcast service using the at least one multicast-broadcast key, or a key derived from the at least one multicast-broadcast key.

At block 1340, the method 1300 may include receiving at least one updated multicast-broadcast key for the data session. In an aspect, for example, the UE 104, the RX processor 356, and/or the controller/processor 359 may execute the multicast receiver component 140 and/or the key management component 142 to receive the at least one updated multicast-broadcast key for the data session. Accordingly, the UE 104, the RX processor 356, and/or the controller/processor 359 executing the multicast receiver component 140 and/or the key management component 142 may provide means for receiving at least one updated multicast-broadcast key for the data session.

For example, at sub-block 1342, the block 1340 may optionally include receiving the at least one updated multicast-broadcast key from the SMF that generated the at least one updated multicast-broadcast key via NAS signaling. For instance, in the first security architecture 500, the UE 104a may receive the at least one updated multicast-broadcast key from the SMF 194 that generated the at least one updated multicast-broadcast key via NAS signaling 510.

As another example, at sub-block 1344, the block 1340 may optionally include receiving a root key generated by the SMF via NAS signaling. For instance, in the second architecture 700, the UE 104a may receive the root key from the SMF 194 via NAS signaling 510. At sub-block 1346 the block 1140 may also optionally include deriving a cell-specific multicast-broadcast key for a cell of an access network node based on the root key. For instance, the key management component 142 may derive the cell-specific multicast-broadcast key for the cell of the RAN node 402 based on the root key. In an aspect, deriving the cell-specific multicast-broadcast key for a cell based on the root key may include deriving the cell-specific multicast-broadcast key based on the root key and a cell identity of the cell. In an aspect, deriving the cell-specific multicast-broadcast key for a cell based on the root key may include: receiving a unique nonce broadcast the cell of the radio access network node; deriving a node key for the radio access network node based on the unique nonce and the root key; and deriving the cell-specific multicast-broadcast key from the node key. For example, the key management component 142 may set the cell-specific multicast-broadcast key as the node key, or derive the cell-specific multicast-broadcast key for the cell based on the node key and the cell identity. In an aspect, the nonce is a common portion of a cell identifier for each cell of the radio access network node. Further, in the security architecture 700, the UE 104 may change from a first cell to a second cell. The key management component 142 may derive a cell-specific multicast-broadcast key for the second cell. The decoding component 144 may decode one or more QoS flow packets from the second cell with the cell-specific multicast-broadcast key for the second cell.

As another example, at sub-block 1348, the block 1340 may optionally include receiving the at least one updated multicast-broadcast key from an access network node that generated the at least one updated multicast-broadcast key via RRC signaling. For example, in security architecture 900 the key management component 142 may receive the at least one updated multicast-broadcast key from the RAN node 402 that generated the at least one updated multicast-broadcast key via RRC signaling. Further, in the security architecture 900, the UE 104 may change from a first cell to a second cell. The key management component 142 may receive a new cell-specific multicast-broadcast key from the second cell. The decoding component 144 may decode one or more QoS flow packets from the second cell with the new cell-specific multicast-broadcast key for the second cell.

At block 1350, the method 1300 may include decoding packets for the multicast or broadcast service received on the RB using the at least one updated multicast-broadcast key, or a key derived from the at least one updated multicast-broadcast key. In an aspect, for example, the UE 104, the RX processor 356, and/or the controller/processor 359 may execute the multicast receiver component 140 and/or the decoding component 144 to decode packets for the multicast or broadcast service received on the RB using the at least one updated multicast-broadcast key, or a key derived from the at least one updated multicast-broadcast key. Accordingly, the UE 104, the RX processor 356, and/or the controller/processor 359 executing the multicast receiver component 140 and/or the decoding component 144 may provide means for decoding packets for the multicast or broadcast service received on the RB using the at least one updated multicast-broadcast key, or a key derived from the at least one updated multicast-broadcast key.

For example, at sub-block 1352, the block 1350 may optionally include decoding encoded QoS flow packets from a PDCP layer using the at least one updated multicast-broadcast key, or a key derived from the at least one updated multicast-broadcast key. For instance, in the security architecture 500, the decoding component 144 may implement a protocol layer above the PDCP layer (e.g., a multicast-broadcast layer) that receives a packet or PDU from the PDCP layer. The decoding component 144 may utilize a security algorithm (e.g., as indicated in the security policy) to decode the packet or PDU from the PDCP layer. In an aspect, PDCP security may be disabled by the security policy in favor of the higher layer security algorithm. Further, the UE 104 may change from a first cell to a second cell in the security architecture 500. The decoding component 144 may decode the one or more QoS flow packets from the second cell without changing the at least one multicast-broadcast key. In particular, since the multicast-broadcast layer shares a key with the UPF 195, the key may not change when changing cells and/or RAN nodes 402.

As another example, at sub-block 1354 the block 1350 may optionally include decoding the packets at a PDCP layer using the cell-specific multicast-broadcast key. For instance, in the security architecture 700 the decoding component 144 may decode the packets at the PDCP layer using the cell-specific multicast-broadcast key derived from the root key. In another implementation, in the security architecture 900 the decoding component 144 may decode the packets at the PDCP layer using the cell-specific multicast-broadcast key received from the RAN node 402.

Figure 14:
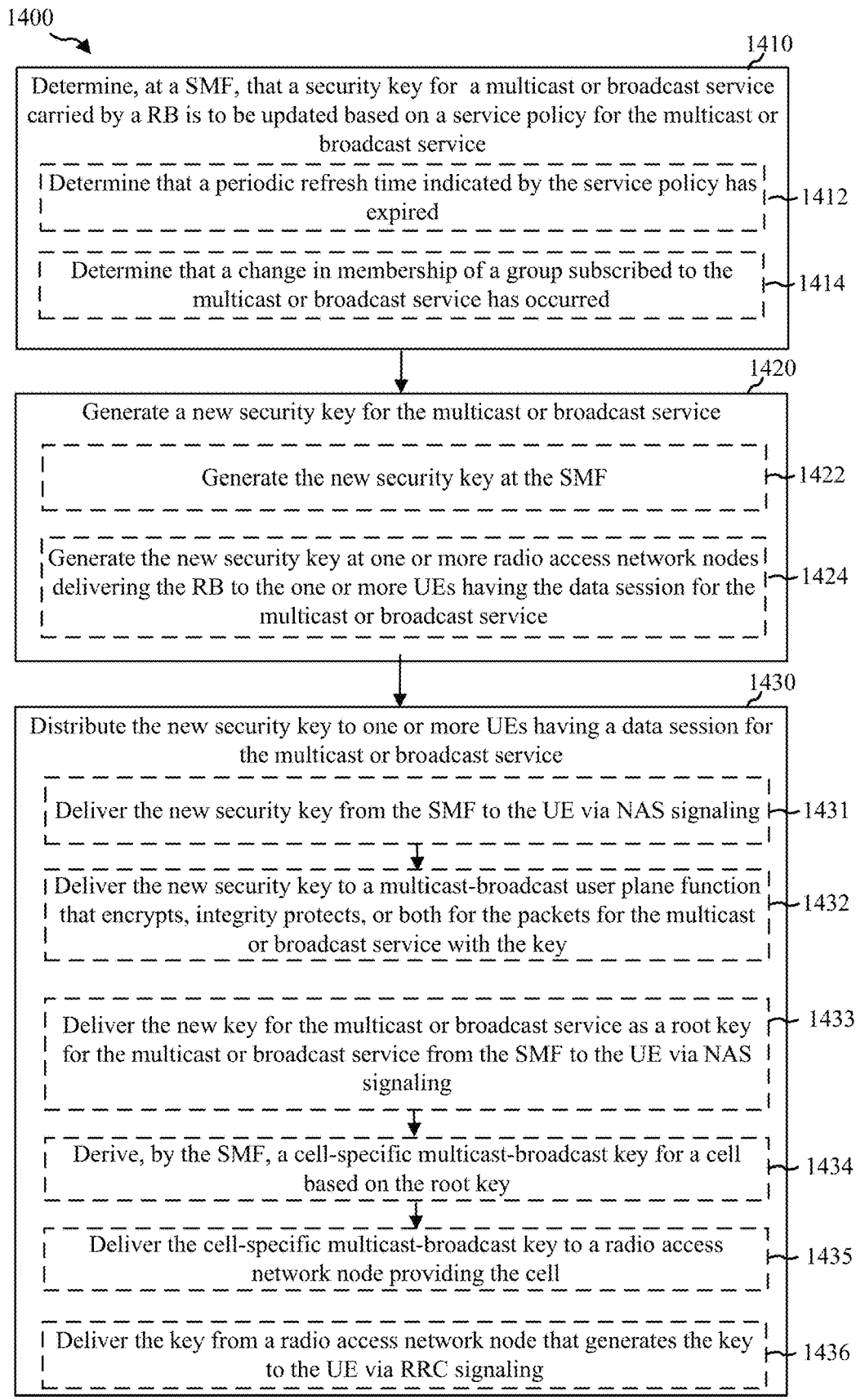
FIG. 14 is a flowchart of an example method for a network to refresh a key for a PDU session for a multicast or broadcast service.

FIG. 14 is a flowchart of a method 1400 of wireless communication that may be performed by a network (e.g., the network 400). In an aspect, the method 1400 may be performed by a network node such as the SMF 194 including the security component 188. As illustrated in FIG. 17, the SMF 194 may include a processor 1712 that executes instructions stored in the memory 1716 for implementing the security component 188 to provide key management and distribution for a multicast or broadcast service. The method 1400 may be performed in communication with one or more UEs 104 including the multicast receiver component 140 and one of a RAN node 402 or UPF 195 including the protection component 198. Optional blocks are shown with dashed lines.

At block 1410, the method 1400 may include determining, at a SMF, that a security key for a multicast or broadcast service carried by a RB is to be updated based on a service policy for the multicast or broadcast service. In an aspect, for example, the SMF 194 or the processor 1712 may execute the security component 188 and/or the service policy component 445 to determine, at a SMF, that a security key for a multicast or broadcast service carried by a RB is to be updated based on a service policy for the multicast or broadcast service. Accordingly, the SMF 194 or the processor 1712 executing the security component 188 and/or the service policy component 445 may provide means for determining, at a SMF, that a security key for multicast or broadcast service carried by a RB is to be updated based on a service policy for the multicast or broadcast service.

For example, at sub-block 1412, the block 1410 may optionally include determining that a periodic refresh time indicated by the service policy has expired. For example, the service policy component 445 may determine that a periodic refresh time indicated by the service policy has expired.

As another example, at sub-block 1414, the block 1410 may optionally include determining that a change in membership of a group subscribed to the multicast or broadcast service has occurred. For example, the service policy component 445 may determine that a change in membership of a group subscribed to the multicast or broadcast service has occurred.

At block 1420, the method 1400 may include generating a new security key for the multicast or broadcast service. In an aspect, for example, the SMF 194 or the processor 1712 may execute the security component 188 and/or the key generation component 441 to generate a new security key for the multicast or broadcast service. Accordingly, the SMF 194 or the processor 1712 executing the security component 188 and/or the key generation component 441 may provide means for generating a new security key for the multicast or broadcast service.

For example, at sub-block 1422, the block 1420 may optionally include generating the new security key at the SMF. For example, the key generation component 441 may generate the new security key at the SMF 194.

As another example, at sub-block 1424, the block 1420 may optionally include generating the new security key at one or more radio access network nodes delivering the RB to the one or more UEs having the data session for the multicast or broadcast service. For example, the key generation component 441 may instruct the RAN nodes 402 delivering the RB to the one or more UEs 104 having the data session for the multicast or broadcast service to generate the new security key.

At block 1430, the method 1400 may include distributing the new security key to one or more UEs having a data session for the multicast or broadcast service. In an aspect, for example, the SMF 194 or the processor 1712 may execute the security component 188 and/or the key distribution component 443 to distribute the new security key to one or more UEs having the data session for the multicast or broadcast service. Accordingly, the SMF 194 or the processor 1712 executing the security component 188 and/or the key distribution component 443 may provide means distributing the new security key to one or more UEs having a data session for the multicast or broadcast service.

For example, in sub-block 1431, the block 1430 may optionally include delivering the new security key from the SMF to the UE via NAS signaling. For instance, the key distribution component 443 may deliver the new security key from the SMF to the UE via NAS signaling 510. In sub-block 1432, the block 1430 may further optionally include delivering the new security key to a multicast-broadcast user plane function that encrypts, integrity protects, or both for the packets of the multicast or broadcast service with the new security key. For instance, the key distribution component 443 may deliver the new security key to the UPF 195 including the protection component 198 that encrypts, integrity protects, or both for the packets of the multicast or broadcast service with the new security key.

For example, in sub-block 1433, the block 1430 may optionally include delivering the new security key for the multicast or broadcast service as a root key for the multicast or broadcast service from the SMF to the UE via NAS signaling. For instance the key distribution component 443 may deliver the new security key for the multicast or broadcast service as a root key for the multicast or broadcast service from the SMF 194 to the UE 104 via NAS signaling 510. Further, in sub-block 1434, the block 1430 may optionally include deriving, by the SMF, a new cell-specific multicast-broadcast key for a cell based on the root key. For instance, the key distribution component 443 may derive, by the SMF, the new cell-specific multicast-broadcast key for the cell based on the root key. Additionally, in sub-block 1435, the block 1430 may optionally include delivering the new cell-specific multicast-broadcast key to a radio access network node providing the cell. For instance, the key distribution component 443 may deliver the new cell-specific multicast-broadcast key to a RAN node 402 providing the cell.

Returning to sub-block 1434, deriving the new cell-specific multicast-broadcast key for a cell based on the root key may include deriving the new cell-specific multicast-broadcast key based on the root key and a cell identity of the cell. In another aspect, deriving the new cell-specific multicast-broadcast key for a cell based on the root key may include generating a unique nonce to be broadcast by each cell of the radio access network node; deriving a node key for the radio access network node based on the unique nonce and the root key; and deriving, by the radio access network node, the new cell-specific multicast-broadcast key. For example, the radio access network node may set the new cell-specific multicast-broadcast key as the node key for every cell of the radio access network node, or derive the new cell-specific multicast-broadcast key for each cell based on the node key and a respective cell identity. In another aspect, the nonce is a common portion of a cell identifier for each cell of the radio access network node.

In another example, in sub-block 1436, the block 1430 may optionally include delivering the new security key from a radio access network node that generates the key to the UE via RRC signaling. For example, the key distribution component 443 may instruct a radio access network node that generates the new security key to deliver the new security key to the UE via RRC signaling.

Figure 15:
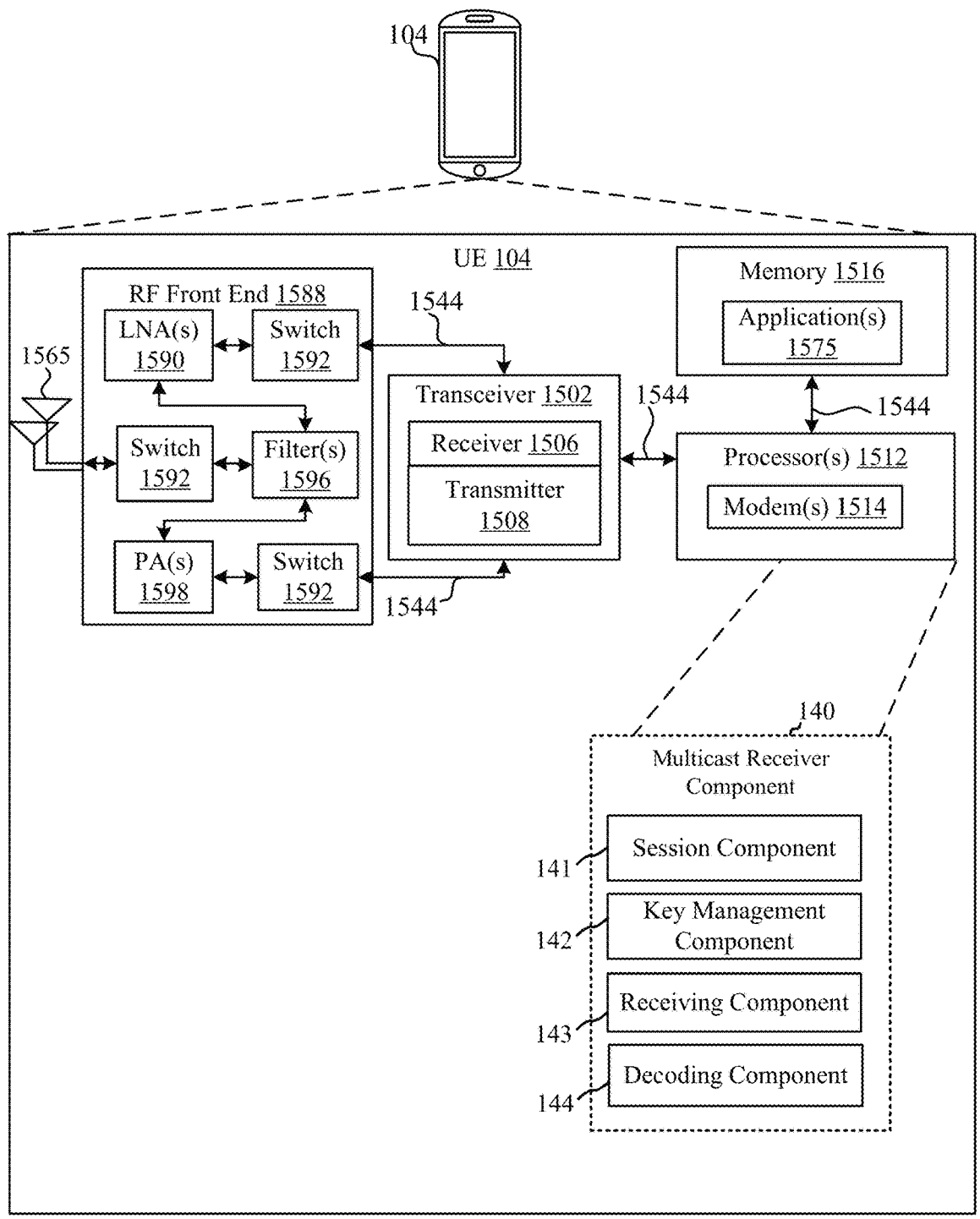
FIG. 15 is a schematic diagram of example components of the UE of FIG. 1.

Referring to FIG. 15, one example of an implementation of UE 104 may include a variety of components, some of which have already been described above, but including components such as one or more processors 1512 and memory 1516 and transceiver 1502 in communication via one or more buses 1544, which may operate in conjunction with modem 1514, and multicast receiver component 140 to enable one or more of the functions described herein related to receiving a multicast transmission for a G-RNTI. Further, the one or more processors 1512, modem 1514, memory 1516, transceiver 1502, RF front end 1588 and one or more antennas 1565 may be configured to support voice and/or data calls (simultaneously or non-simultaneously) in one or more radio access technologies. The antennas 1565 may include one or more antennas, antenna elements, and/or antenna arrays.

In an aspect, the one or more processors 1512 may include a modem 1514 that uses one or more modem processors. The various functions related to multicast receiver component 140 may be included in modem 1514 and/or processors 1512 and, in an aspect, may be executed by a single processor, while in other aspects, different ones of the functions may be executed by a combination of two or more different processors. For example, in an aspect, the one or more processors 1512 may include any one or any combination of a modem processor, or a baseband processor, or a digital signal processor, or a transmit processor, or a receiver processor, or a transceiver processor associated with transceiver 1502. In other aspects, some of the features of the one or more processors 1512 and/or modem 1514 associated with multicast receiver component 140 may be performed by transceiver 1502.

Also, memory 1516 may be configured to store data used herein and/or local versions of applications 1575, Multicast receiver component 140 and/or one or more of subcomponents thereof being executed by at least one processor 1512. Memory 1516 may include any type of computer-readable medium usable by a computer or at least one processor 1512, such as random access memory (RAM), read only memory (ROM), tapes, magnetic discs, optical discs, volatile memory, non-volatile memory, and any combination thereof. In an aspect, for example, memory 1516 may be a non-transitory computer-readable storage medium that stores one or more computer-executable codes defining multicast receiver component 140 and/or one or more of subcomponents thereof, and/or data associated therewith, when UE 104 is operating at least one processor 1512 to execute multicast receiver component 140 and/or one or more subcomponents thereof.

Transceiver 1502 may include at least one receiver 1506 and at least one transmitter 1508. Receiver 1506 may include hardware, firmware, and/or software code executable by a processor for receiving data, the code comprising instructions and being stored in a memory (e.g., computer-readable medium). Receiver 1506 may be, for example, a radio frequency (RF) receiver. In an aspect, receiver 1506 may receive signals transmitted by at least one base station 102. Additionally, receiver 1506 may process such received signals, and also may obtain measurements of the signals, such as, but not limited to, Ec/Io, SNR, RSRP, RSSI, etc. Transmitter 1508 may include hardware, firmware, and/or software code executable by a processor for transmitting data, the code comprising instructions and being stored in a memory (e.g., computer-readable medium). A suitable example of transmitter 1508 may including, but is not limited to, an RF transmitter.

Moreover, in an aspect, UE 104 may include RF front end 1588, which may operate in communication with one or more antennas 1565 and transceiver 1502 for receiving and transmitting radio transmissions, for example, wireless communications transmitted by at least one base station 102 or wireless transmissions transmitted by UE 104. RF front end 1588 may be connected to one or more antennas 1565 and may include one or more low-noise amplifiers (LNAs) 1590, one or more switches 1592, one or more power amplifiers (PAs) 1598, and one or more filters 1596 for transmitting and receiving RF signals.

In an aspect, LNA 1590 may amplify a received signal at a desired output level. In an aspect, each LNA 1590 may have a specified minimum and maximum gain values. In an aspect, RF front end 1588 may use one or more switches 1592 to select a particular LNA 1590 and its specified gain value based on a desired gain value for a particular application.

Further, for example, one or more PA(s) 1598 may be used by RF front end 1588 to amplify a signal for an RF output at a desired output power level. In an aspect, each PA 1598 may have specified minimum and maximum gain values. In an aspect, RF front end 1588 may use one or more switches 1592 to select a particular PA 1598 and its specified gain value based on a desired gain value for a particular application.

Also, for example, one or more filters 1596 may be used by RF front end 1588 to filter a received signal to obtain an input RF signal. Similarly, in an aspect, for example, a respective filter 1596 may be used to filter an output from a respective PA 1598 to produce an output signal for transmission. In an aspect, each filter 1596 may be connected to a specific LNA 1590 and/or PA 1598. In an aspect, RF front end 1588 may use one or more switches 1592 to select a transmit or receive path using a specified filter 1596, LNA 1590, and/or PA 1598, based on a configuration as specified by transceiver 1502 and/or processor 1512.

As such, transceiver 1502 may be configured to transmit and receive wireless signals through one or more antennas 1565 via RF front end 1588. In an aspect, transceiver 1502 may be tuned to operate at specified frequencies such that UE 104 can communicate with, for example, one or more base stations 102 or one or more cells associated with one or more base stations 102. In an aspect, for example, modem 1514 may configure transceiver 1502 to operate at a specified frequency and power level based on the UE configuration of the UE 104 and the communication protocol used by modem 1514.

In an aspect, modem 1514 may be a multiband-multimode modem, which can process digital data and communicate with transceiver 1502 such that the digital data is sent and received using transceiver 1502. In an aspect, modem 1514 may be multiband and be configured to support multiple frequency bands for a specific communications protocol. In an aspect, modem 1514 may be multimode and be configured to support multiple operating networks and communications protocols. In an aspect, modem 1514 may control one or more components of UE 104 (e.g., RF front end 1588, transceiver 1502) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 16:
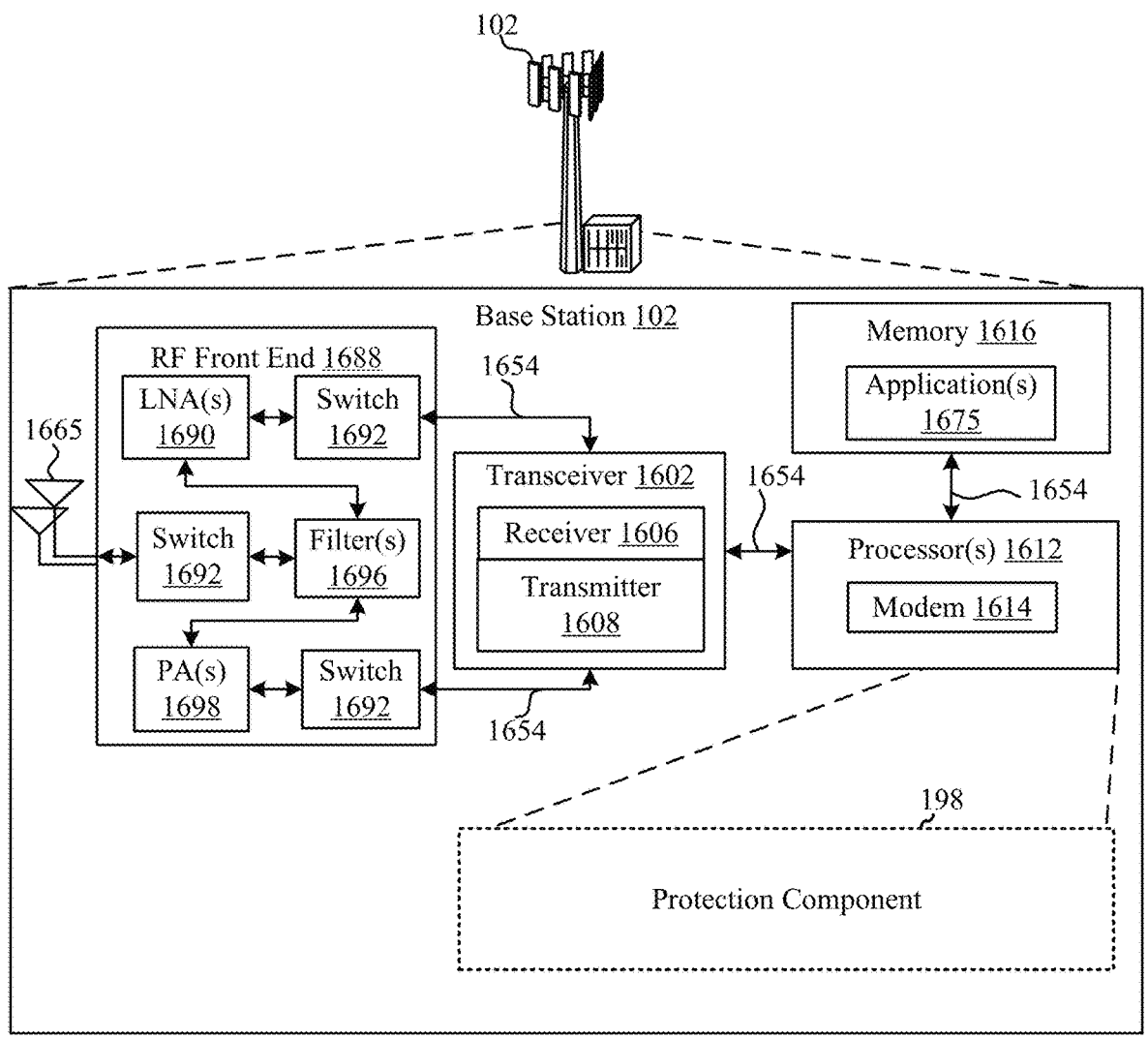
FIG. 16 is a schematic diagram of example components of the base station of FIG. 1.

Referring to FIG. 16, one example of an implementation of base station 102 may include a variety of components, some of which have already been described above, but including components such as one or more processors 1612 and memory 1616 and transceiver 1602 in communication via one or more buses 1654, which may operate in conjunction with modem 1614 and protection component 198 to enable one or more of the functions described herein related to protecting packets of a QoS flow for a multicast or broadcast service.

The transceiver 1602, receiver 1606, transmitter 1608, one or more processors 1612, memory 1616, applications 1675, buses 1654, RF front end 1688, LNAs 1690, switches 1692, filters 1696, PAs 1698, and one or more antennas 1665 may be the same as or similar to the corresponding components of UE 104, as described above, but configured or otherwise programmed for base station operations as opposed to UE operations.

Referring to FIG. 17, one example of an implementation of SMF 194 may include a variety of components, some of which have already been described above, but including components such as one or more processors 1712 and memory 1716 and transceiver 1702 in communication via one or more buses 1754, which may operate in conjunction with modem 1714 and security component 188 to enable one or more of the functions described herein related to key generation, key refresh, and key distribution for a QoS flow for a multicast or broadcast service.

The transceiver 1702, receiver 1706, transmitter 1708, one or more processors 1712, memory 1716, applications 1775, buses 1754, RF front end 1788, LNAs 1790, switches 1792, filters 1796, PAs 1798, and one or more antennas 1765 may be the same as or similar to the corresponding components of UE 104, as described above, but configured or otherwise programmed for SMF operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
a memory; and
at least one processor coupled to the memory and configured to:
transmit a UE capability message indicating one or more security algorithms;
receive a security policy, via non-access stratum (NAS) signaling or radio resource control (RRC) signaling, indicating a selected security algorithm;
receive at least one multicast-broadcast key for a multicast or broadcast service carried by a radio bearer (RB) associated with a data session;
receive at least one updated multicast-broadcast key for the data session via the NAS signaling protected by radio access network (RAN) security between a core network node and the UE or RRC via a reconfiguration message for the UE from a radio access network (RAN) node with which the UE is in a connected mode; and
decode packets for the multicast or broadcast service received on the RB using the at least one updated multicast-broadcast key, or a key derived from the updated multicast-broadcast key utilizing the selected security algorithm.

2. The apparatus of claim 1, wherein the at least one processor is configured to receive the at least one updated multicast-broadcast key from a session management function (SMF) that generated the updated multicast-broadcast key via the NAS signaling over an N4 interface.

3. The apparatus of claim 2, wherein the at least one processor is configured to decode encoded Quality of Service (QoS) flow packets from a packet data convergence protocol (PDCP) layer using the at least one updated multicast-broadcast key, or a key derived from the at least one updated multicast-broadcast key.

4. The apparatus of claim 2, wherein the at least one processor is configured to:
change from a first cell to a second cell; and
decode packets for the multicast or broadcast service from the second cell without changing the multicast-broadcast key.

5. The apparatus of claim 1, wherein the at least one processor is configured to receive the at least one multicast-broadcast key from the RAN node that generated the at least one updated multicast-broadcast key.

6. The apparatus of claim 5, wherein the at least one processor is configured to decode the packets at a packet data convergence protocol (PDCP) layer using the updated multicast-broadcast key.

7. The apparatus of claim 5, wherein the at least one processor is configured to:
change from a first cell to a second cell;
receive a new cell-specific multicast-broadcast key from the second cell; and
decode the packets from the second cell with the new cell-specific multicast-broadcast key for the second cell.

8. The apparatus of claim 1, wherein the data session includes one or more QoS flows, each QoS flow being associated with a unique multicast-broadcast key of the at least one updated multicast-broadcast key.

9. The apparatus of claim 1, wherein the data session is a protocol data unit (PDU) session.

10. The apparatus of claim 1, wherein the at least one processor is configured to, prior to receiving the at least one updated multicast-broadcast key:
receive packets for the multicast or broadcast service; and
decode the packets for the multicast or broadcast service using the at least one multicast-broadcast key, or a key derived from the at least one multicast-broadcast key.

11. An apparatus for wireless communication at a user equipment (UE), comprising:
a memory; and
at least one processor coupled to the memory and configured to:
receive at least one multicast-broadcast key for a multicast or broadcast service carried by a radio bearer (RB) associated with a data session;
receive at least one updated multicast-broadcast key for the data session; and
decode packets for the multicast or broadcast service received on the RB using the at least one updated multicast-broadcast key, or a key derived from the updated multicast-broadcast key,
wherein to receive the at least one multicast-broadcast key, the at least one processor is configured to:
receive a root key generated by a session management function (SMF) via NAS signaling; and
derive a cell-specific multicast-broadcast key for a first cell of a radio access network node based on the root key.

12. The apparatus of claim 11, wherein the at least one processor is configured to decode the packets at a packet data convergence protocol (PDCP) layer using the cell-specific multicast-broadcast key.

13. The apparatus of claim 11, wherein the at least one processor is configured to:
transmit a UE capability message indicating one or more security algorithms; and
receive a security policy, via radio resource control (RRC) signaling, indicating a selected security algorithm for the decoding.

14. The apparatus of claim 11, wherein the at least one processor is configured to:
change from the first cell to a second cell;
derive a cell-specific multicast-broadcast key for the second cell; and
decode the packets from the second cell with the cell-specific multicast-broadcast key for the second cell.

15. A method of wireless communication for a user equipment (UE), comprising:
transmitting a UE capability message indicating one or more security algorithms;
receiving a security policy, via non-access stratum (NAS) signaling or radio resource control (RRC) signaling, indicating a selected security algorithm;
receiving at least one multicast-broadcast key for a multicast or broadcast service carried by a radio bearer (RB) associated with a data session;
receiving at least one updated multicast-broadcast key for the data session via the NAS signaling protected by radio access network (RAN) security between a core network node and the UE or via a RRC reconfiguration message for the UE from a radio access network (RAN) node with which the UE is in a connected mode; and decoding packets for the multicast or broadcast service received on the RB using the at least one updated multicast-broadcast key, or a key derived from the at least one updated multicast-broadcast key.

16. The method of claim 15, wherein receiving at least one updated multicast-broadcast key for the data session comprises receiving the at least one updated multicast-broadcast key from a session management function (SMF) that generated the updated multicast-broadcast key via the NAS signaling over an N4 interface.

17. The method of claim 16, wherein decoding packets for the multicast or broadcast service comprises decoding encoded Quality of Service (QoS) flow packets from a packet data convergence protocol (PDCP) layer using the at least one updated multicast-broadcast key, or a key derived from the at least one updated multicast-broadcast key.

18. The method of claim 16, further comprising:
changing from a first cell to a second cell; and
decoding packets for the multicast or broadcast service from the second cell without changing the multicast-broadcast key.

19. The method of claim 15, wherein receiving at least one updated multicast-broadcast key for the data session comprises receiving the at least one updated multicast-broadcast key from the RAN node that generated the at least one updated multicast-broadcast key.

20. The method of claim 19, wherein decoding packets for the multicast or broadcast service comprises decoding the packets at a packet data convergence protocol (PDCP) layer using the updated multicast-broadcast key.

21. The method of claim 19, further comprising:
changing from a first cell to a second cell;
receiving a new cell-specific multicast-broadcast key from the second cell; and
decoding the packets from the second cell with the new cell-specific multicast-broadcast key for the second cell.

22. The method of claim 15, wherein the data session includes one or more QoS flows, each QoS flow being associated with a unique multicast-broadcast key of the at least one updated multicast-broadcast key.

23. The method of claim 15, wherein the data session is a protocol data unit (PDU) session.

24. The method of claim 15, further comprising, prior to receiving the at least one updated multicast-broadcast key:
receiving packets for the multicast or broadcast service; and
decoding the packets for the multicast or broadcast service using the at least one multicast-broadcast key, or a key derived from the at least one multicast-broadcast key.

25. A method of wireless communication, comprising:
receiving at least one multicast-broadcast key for a multicast or broadcast service carried by a radio bearer (RB) associated with a data session;
receiving at least one updated multicast-broadcast key for the data session, wherein receiving at least one updated multicast-broadcast key for the data session comprises:
receiving a root key generated by a session management function (SMF) via NAS signaling; and
deriving a cell-specific multicast-broadcast key for a first cell of a radio access network node based on the root key; and
decoding packets for the multicast or broadcast service received on the RB using the at least one updated multicast-broadcast key, or a key derived from the at least one updated multicast-broadcast key.

26. The method of claim 25, wherein decoding packets for the multicast or broadcast service comprises decoding the packets at a packet data convergence protocol (PDCP) layer using the cell-specific multicast-broadcast key.

27. The method of claim 25, further comprising:
transmitting a UE capability message indicating one or more security algorithms; and
receiving a security policy, via RRC signaling, indicating a selected security algorithm for the decoding.

28. The method of claim 25, further comprising:
changing from the first cell to a second cell;
deriving a cell-specific multicast-broadcast key for the second cell; and
decoding the packets from the second cell with the cell-specific multicast-broadcast key for the second cell.

* * * * *